United States Patent
John et al.

(10) Patent No.: US 11,520,583 B2
(45) Date of Patent: Dec. 6, 2022

(54) SERVERLESS WORKFLOW ENABLEMENT AND EXECUTION PLATFORM

(71) Applicant: Calvert Ventures LLC, Seattle, WA (US)

(72) Inventors: Pushpam Joseph Aji John, Seattle, WA (US); Kristiina Ausmees, Sweden (SE)

(73) Assignee: CALVERT VENTURES LLC, Seattle, WA (US)

( * ) Notice: Subject to any disclaimer, the term of this patent is extended or adjusted under 35 U.S.C. 154(b) by 204 days.

(21) Appl. No.: 17/086,914

(22) Filed: Nov. 2, 2020

(65) Prior Publication Data

US 2021/0132947 A1 May 6, 2021

Related U.S. Application Data

(60) Provisional application No. 62/929,710, filed on Nov. 1, 2019.

(51) Int. Cl.
| | |
|---|---|
| *G06F 9/48* | (2006.01) |
| *G06F 9/50* | (2006.01) |
| *G06N 20/00* | (2019.01) |
| *G06F 9/30* | (2018.01) |
| *G06F 16/9035* | (2019.01) |
| *G06K 9/62* | (2022.01) |

(52) U.S. Cl.
CPC .......... *G06F 9/3005* (2013.01); *G06F 9/4881* (2013.01); *G06F 9/5027* (2013.01); *G06F 9/5072* (2013.01); *G06F 16/9035* (2019.01); *G06K 9/6256* (2013.01); *G06N 20/00* (2019.01)

(58) Field of Classification Search
CPC .... G06F 9/4881; G06F 9/5027; G06F 9/5072; G06N 20/00
See application file for complete search history.

(56) References Cited

U.S. PATENT DOCUMENTS

| | | | |
|---|---|---|---|
| 2019/0317805 A1* | 10/2019 | Metsch | G06F 9/4881 |
| 2020/0019854 A1* | 1/2020 | Abraham | G06F 9/4843 |
| 2020/0073708 A1* | 3/2020 | Chakra | G06F 9/5083 |
| 2021/0109789 A1* | 4/2021 | McWeeney | G06F 9/5022 |
| 2022/0100558 A1* | 3/2022 | Jia | G06F 9/5011 |
| 2022/0156114 A1* | 5/2022 | Nagpal | G06F 11/3433 |

* cited by examiner

*Primary Examiner* — Jacob Petranek
(74) *Attorney, Agent, or Firm* — Dority & Manning, P.A.

(57) ABSTRACT

The present disclosure provides computing systems and methods that optimize the execution of workflows that include computational tasks (e.g., which may take the form of functions or containers). In general, the proposed systems and methods can be referred as to or embodied within a serverless workflow enablement and execution platform (also referred to herein as a workflow management system). The serverless workflow platform can facilitate performance of a large-scale computational workflow. In particular, the serverless workflow platform can facilitate performance of serverless workflows that are executed on serverless execution platforms.

20 Claims, 21 Drawing Sheets

SERVERLESS WORKFLOW ENABLEMENT AND EXECUTION PLATFORM

RELATED APPLICATIONS

This application claims priority to and the benefit of U.S. Provisional Patent Application No. 62/929,710, which is hereby incorporated by reference in its entirety.

FIELD

The present disclosure relates generally to computing systems and methods for the execution of tasks in cloud-based infrastructures. More particularly, the present disclosure relates to a computing system that utilizes machine learning and/or other optimization techniques to select one of a number of possible cloud service providers to execute each of a number of tasks included in a serverless workflow.

BACKGROUND

Serverless computing has recently gained popularity as an alternative to the traditional Infrastructure as a Service (IaaS) model for cloud-based computation. With billing based on consumption and inherent elasticity of resources, the serverless paradigm relieves the user from provisioning and maintaining the computing infrastructure, and many commercial cloud service providers, including Amazon Web Services (AWS), Google Cloud Platform (GCP), Microsoft Azure, and IBM now offer serverless options. Function as a Service (FaaS) platforms like AWS Lambda, Google Cloud Functions and Azure Functions allow code to be executed as "stateless" functions, meaning the user is unaware of the execution environment and there is no persistent maintenance of state between invocations. Some providers also offer serverless options to run containers in a stateless manner on Container as a Service (CaaS) platforms, e.g. AWS Fargate and Azure Container Instances.

The workflow concept constitutes a common model for describing sets of interdependent steps involved in academic, industrial, or other applications. In particular, a workflow can include a set of tasks and a set of rules governing their execution. A task can be an executable unit expressed as a function or a container. In some examples, workflows are characterized according to the directed acyclic graph formalism, defined using a data serialization language.

While certain workflow management systems (WMS) are available, such systems still rely on the user to set up and configure clusters or IaaS cloud resources. Even for experienced users, manual configuration of cloud resource usage is time-consuming and can lead to system inefficiencies such as increased cost, slower runtime, or even workflow execution errors. In particular, executing workflows in cloud infrastructures can be challenging due to the management that the provisioned infrastructure requires. Furthermore, the efficient use of cloud resources may be difficult to achieve.

SUMMARY

Example aspects of the present disclosure are directed to computing systems and methods that optimize the execution of workflows that include computational tasks (e.g., which may take the form of functions or containers). In general, the proposed systems and methods can be referred as to or embodied within a serverless workflow enablement and execution platform (also referred to herein as "SWEEP").

The serverless workflow platform can facilitate performance of a large-scale computational workflow. In particular, the serverless workflow platform can facilitate performance of serverless workflows that are executed on serverless execution platforms.

The proposed serverless workflow enablement and execution platform can utilize machine learning and/or other optimization techniques to perform various aspects of enabling performance or execution of the workflows, including, as one example, generating or selecting a respective task execution configuration for each of a number of tasks included in the workflow. The task execution configuration for each task can include information that identifies one of a number of possible cloud service providers (CSPs) to execute the task. In addition to which CSP to execute the task on, the task execution configuration can also describe a timing of the execution of the task or an amount of memory and processing resources to allocate for the execution of the task.

The optimization method employed by the platform may be one of several machine learning algorithms (e.g., machine-learned models generated through application of machine learning techniques). The machine learning algorithms may be informed by data from the user, the CSPs, and/or information collected by the system from previous executions.

In particular, according to an aspect of the present disclosure, a machine-learned model can predict a task execution configuration for a task based on a set of inputs which can include some or all of the following information: a description of the workflow; a description of where any data that needs to be accessed to perform the task is stored; a description of past task allocation decisions (e.g., previous tasks in the same execution of the same workflow); a description of any user-specified objectives constraints such as a maximum runtime, a maximum cost, a preference for use of a certain CSP; a description of the task (e.g., whether the task is a function as a task (FaaT), container as a task (CaaT), or other; a description of a current status of the workflow (e.g., current cumulative cost vs. max total cost, current workflow execution time vs. max time, etc.); and/or other information. Based on such input(s), a machine-learned model can predict a task execution configuration. The task execution configuration can identify one of a number of possible CSPs to execute the task; describe a timing of the execution of the task and/or an amount of memory and processing resources to allocate for the execution of the task; and/or other characteristics of execution of the task.

In some implementations, the serverless workflow platform described herein can be installed upon and executed directly by a user's device such as a user's desktop, laptop, laboratory computing network, local computing network, etc. Alternatively or additionally, the serverless workflow platform can be provided to the user as a service (e.g., installed upon and executed by one or more server computing devices that engage with the user's device in a client-server relationship). In some implementations, multiple instances of the serverless workflow platform can be initialized (e.g., upon different devices, at different geographic locations, and/or hosted by different CSPs). The multiple different instances of the platform can correspond to the multiple different CSPs. For example, a first instance of the platform can be hosted at a first CSP and the first instance of the platform can be used to enable execution of tasks which are allocated for execution by the first CSP, and so on.

In some instances, the workflows to be executed by the platform can be uploaded to the platform by a user. In addition or alternatively to uploading of the workflows, the workflow platform can provide functionality for creating workflows. For example, in some implementations of the present disclosure, the platform can provide (e.g., via a web portal) the user with a graphical user interface in which users can define workflows in a graphical manner.

In some implementations, upon creation of a function or a container, the user can register it to the system as a task. Registered tasks can be used to build workflows by defining rules governing the execution of the tasks. Examples of rules are that a particular task must finish execution before another task begins execution, or a task can only be executed if the output of another task fulfils a condition.

The workflow platform can facilitate execution of the workflow through communication with various computing devices or resources such as, for example, by communicating with various CSPs to procure execution of particular tasks included in the workflow (e.g., in a serverless manner).

The proposed systems and methods can be used to enable execution of workflows that correspond to tasks associated with any different use case or application. As examples, the proposed systems and methods can be used to enable execution of workflows associated with asset tracking, self-driving vehicles, satellite imaging and/or analysis of satellite images, analysis of genomic dataset, precision agriculture, precision medicine, and/or various other applications. Thus, example applications of the present disclosure include monitoring of natural systems such as, for example, crop monitoring and/or monitoring of ecological conditions in a geographic area.

The proposed systems and methods have a number of technical effects and benefits. As one example, the proposed systems and methods can enable more efficient performance of serverless workflows. Specifically, workflows can be performed with lower latency (e.g., runtime), at lower costs, or in otherwise improved manners. As another technical effect and benefit, the proposed systems and methods leverage a multi-cloud environment which can enable workflows to be executed/accomplished even when a particular CSP is offline or otherwise inoperative. Thus, the multi-cloud nature of the proposed workflow system provides a backup system that enables critical workflows to be maintained despite service provider failures. As one example, some implementations of the proposed systems and methods can have built-in re-try capabilities. For example, if execution of a certain task by a first CSP stalls or otherwise fails, the workflow platform can automatically re-route execution of the task to a second CSP, thereby ensuring that the task is executed while still satisfying any service level agreements. The platform can also support default retry a set number of times configured with a simple timed and exponentially back retry.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

The attached Appendix, which is incorporated into and forms a portion of this disclosure, describes example implementations and experimental uses of the systems and methods described herein. The present disclosure is not limited to the example implementations described in the Appendix.

BRIEF DESCRIPTION OF THE DRAWINGS

Detailed discussion of embodiments directed to one of ordinary skill in the art is set forth in the specification, which makes reference to the appended figures, in which.

Figure 1A:
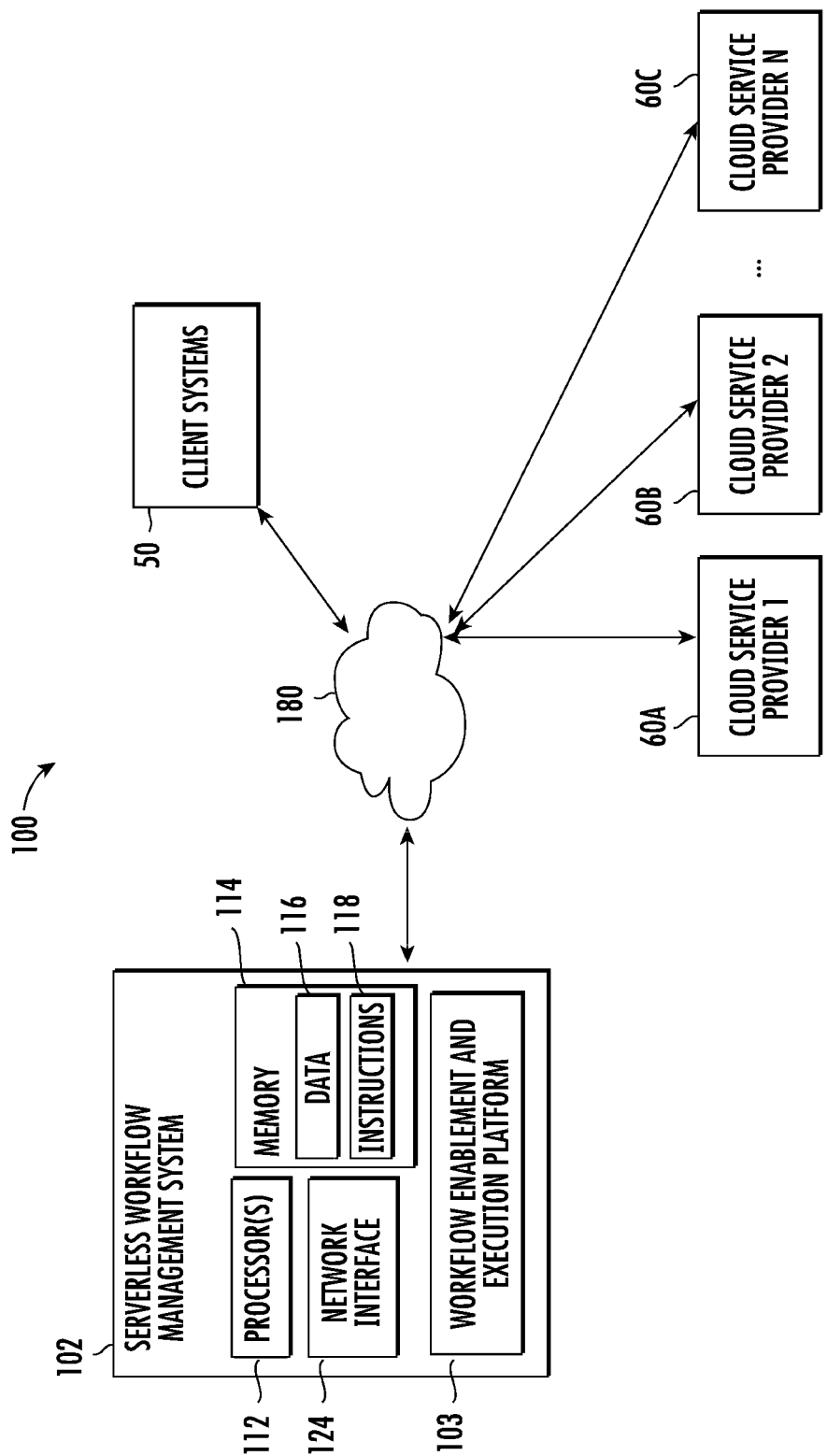
FIGS. 1A-C depicts example computing environments according to example embodiments of the present disclosure.

Reference numerals repeated across multiple figures are intended to indicate the same feature or component used in different example embodiments and/or at different scales of detail.

DETAILED DESCRIPTION

Example Devices and Systems

Figure 1B:
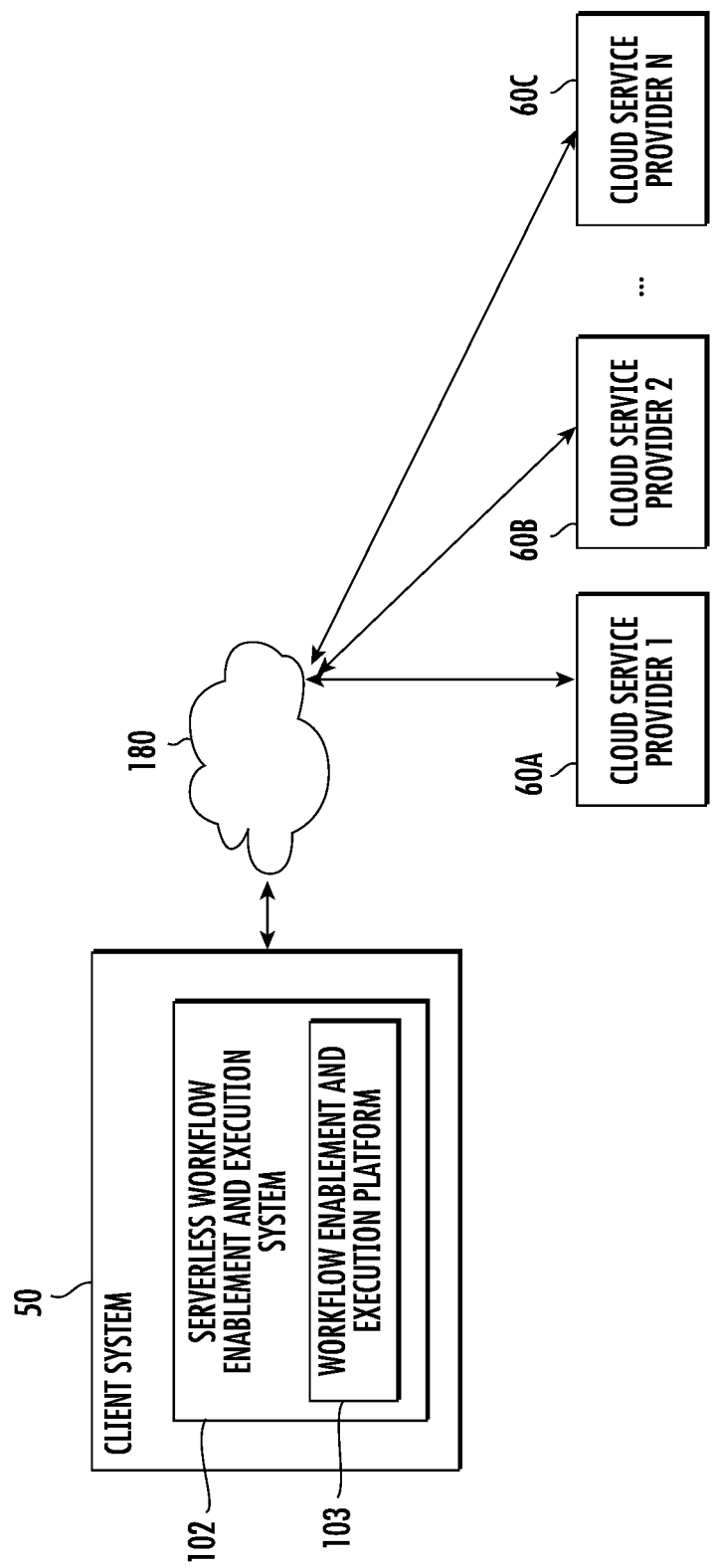
Figure 1C:
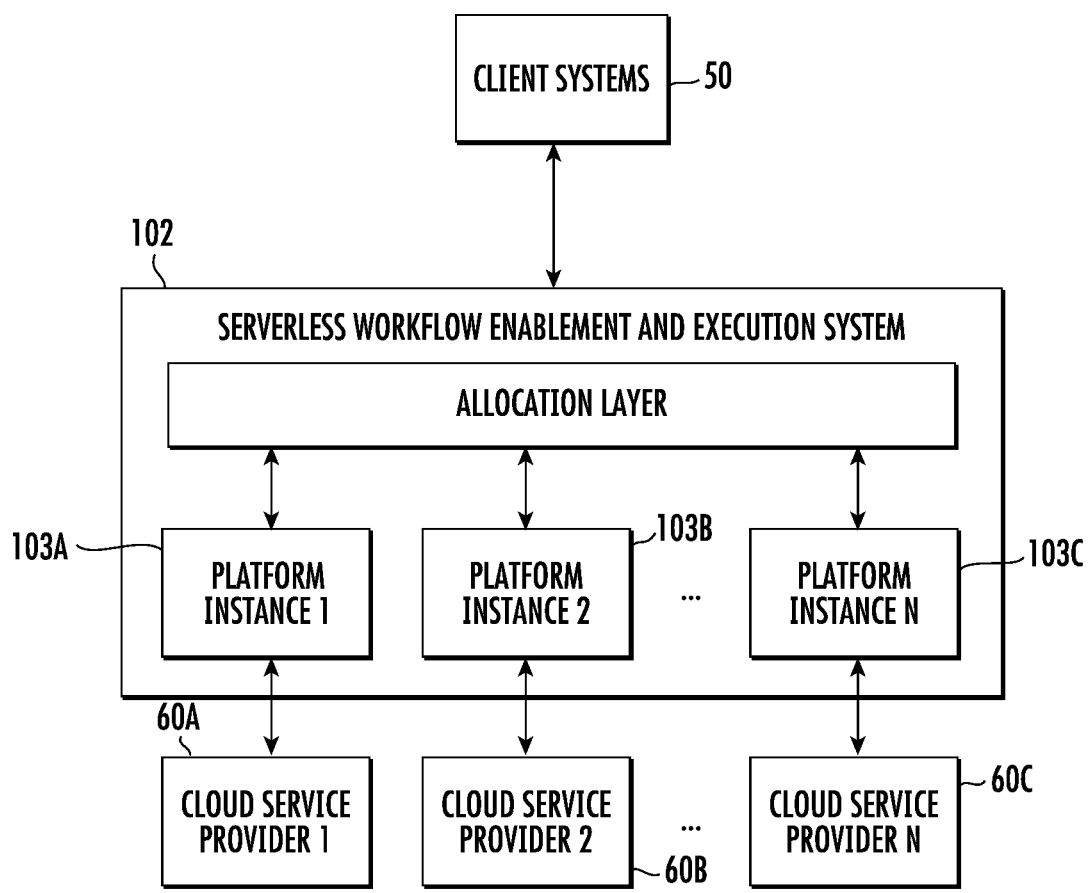

FIGS. 1A-C depicts example computing environments according to example embodiments of the present disclosure.

Referring first to FIG. 1A, FIG. 1A depicts a block diagram of an example system 100 for workflow management. The system 100 includes a workflow management computing system 102, one or more client computing systems 50, and one or more cloud service provider systems 60a-c that are communicatively connected over one or more networks 180.

In particular, in FIG. 1A, the workflow management computing system 102 and the one or more client computing systems 50 are arranged in a server-client relationship. For example, the functionality of the workflow management computing system 102 can be provided to the client computing systems 50 in a software as a service (SaaS) model.

Each client computing system 50 can be associated with a client that is seeking to have a workflow executed. A client computing system 50 can include any number of computing devices such as laptops, desktops, personal devices (e.g., smartphones), server devices, etc.

Likewise, each of the cloud service provider systems 60a-c can be associated with a cloud service provider offers (e.g., through the use of APIs or otherwise) cloud services which can be requested such as cloud-based storage, function execution, container execution, computational operations, etc. Example cloud service provider systems include Amazon Web Services (AWS), Google Cloud Platform (GCP), Microsoft Azure, and IBM serverless options. Function as a Service (FaaS) platforms like AWS Lambda, Google Cloud Functions and Azure Functions allow code to be executed as "stateless" functions, meaning the user is unaware of the execution environment and there is no persistent maintenance of state between invocations. Some providers also offer serverless options to run containers in a stateless manner on Container as a Service (CaaS) platforms, e.g. AWS Fargate and Azure Container Instances.

The workflow management computing system 102 can provide a workflow enablement and execution platform which can enable execution of a workflow associated with or provided by a client system. The platform 103 can be provided as or via a web application, an application run at a client computing system 50 (e.g., for which the computing system 102 serves as a backend), and/or via other techniques.

The workflow management computing system 102 can include any number of computing devices such as laptops, desktops, personal devices (e.g., smartphones), server devices, etc. Multiple devices (e.g., server devices) can operate in series and/or in parallel.

The workflow management computing system 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the workflow management computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein.

The workflow management computing system 102 can also include a network interface 124 used to communicate with one or more systems or devices, including systems or devices that are remotely located from the workflow management computing system 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

In general, the workflow management computing system 102 can receive and synthesize information from each of the client computing systems 50 and/or the cloud service provider systems 60a-c to produce reports, data tables, status updates, alerts, and/or the like that provide information regarding the current and predicted status of workflows. In some implementations, communications between the system 102 and one or more of the client computing systems 50 and/or the cloud service provider systems 60a-c can occur via or according to one or more application programming interfaces (APIs), to facilitate automated and/or simplified data acquisition and/or transmission.

As one example communication, the workflow management computing system 102 can receive a workflow from a client system 50.

According to aspects of the present disclosure, the workflow management computing system 102 can include a workflow enablement and execution platform 103.

In some implementations, the workflow enablement and execution platform 103 can include and use one or more machine-learned models to generate task execution configurations for tasks of a workflow.

Each of the workflow enablement and execution platform 103 or any subsystems or modules thereof can include computer logic utilized to provide desired functionality. Each of the workflow enablement and execution platform 103 or any subsystems or modules thereof can be implemented in hardware, firmware, and/or software controlling a general purpose processor. For example, in some implementations, each of the workflow enablement and execution platform 103 or any subsystems or modules thereof includes program files stored on a storage device, loaded into a memory and executed by one or more processors. In other implementations, each of the workflow enablement and execution platform 103 or any subsystems or modules thereof includes one or more sets of computer-executable instructions that are stored in a tangible computer-readable storage medium such as RAM hard disk or optical or magnetic media.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

As described elsewhere herein, in some implementations, some or all of the workflow enablement and execution platform 103 or any subsystems or modules thereof can include one or more machine-learned models. Thus, in some implementations, the workflow management computing system 102 can store or include one or more machine-learned models (e.g., any of the models discussed herein). For example, the models can be or can otherwise include various machine-learned models such as a random forest model; a logistic regression model; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

In some implementations, the workflow management computing system 102 can train the machine-learned models through use of a model trainer. The model trainer can train the machine-learned models using one or more training or learning algorithms. One example training technique is backwards propagation of errors ("backpropagation"). For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, the model trainer can perform supervised training techniques using a set of labeled training data. In other implementations, the model trainer can perform unsupervised training techniques using a set of unlabeled training data. In other implementations, the model trainer can perform reinforcement learning techniques. In some implementations, model training (or re-training) can occur periodically or otherwise in an "online" fashion in which the model is re-trained based on outcomes that are observed after using the model at inference time (e.g., outcomes of using the model to enable client workflows). The model trainer can perform a number of generalization techniques to improve the generalization capability of the models being trained. Generalization techniques include weight decays, dropouts, or other techniques. The model trainer can be implemented in hardware, software, firmware, or combinations thereof.

The training data can include, for example, historical data that indicates the historical outcomes of various previous workflows. In some implementations, the training data can include a plurality of training example pairs, where each training example pair provides: (1) a set of input data (e.g., as described elsewhere herein); and (2) a ground truth label associated with such set of data, where the ground truth label provides a "correct" task execution configuration for the set of data.

FIG. 1B shows an alternative or additional configuration in which the serverless workflow enablement and execution system 102 is stored on and executed by a client system 50. For example, the workflow system 102 can be an application or other computer program that is executed by the client system 50. The configuration in FIG. 1B has privacy benefits as the workflow information resides only on the client system 50.

FIG. 1C shows an alternative or additional configuration in which multiple instances 103a-c of the serverless workflow platform are initialized (e.g., upon different devices, at different geographic locations, and/or hosted by different CSPs). The multiple different instances 103a-c of the platform can correspond to the multiple different CSPs 60a-c. For example, a first instance 103a of the platform can be hosted at a first CSP 60a and the first instance 103a of the platform can be used to enable execution of tasks which are allocated for execution by the first CSP 60a, and so on.

Thus, in some implementations, the platform itself can be distributed (e.g., across multiple CSPs and or Internet Service Providers (ISPs). In such implementations, the workflow management system can perform load balancing techniques not to balance the distributed workload but to route/allocate particular tasks to specific instances of the platform so that they can be optimally executed by a corresponding CSP.

Figure 2:
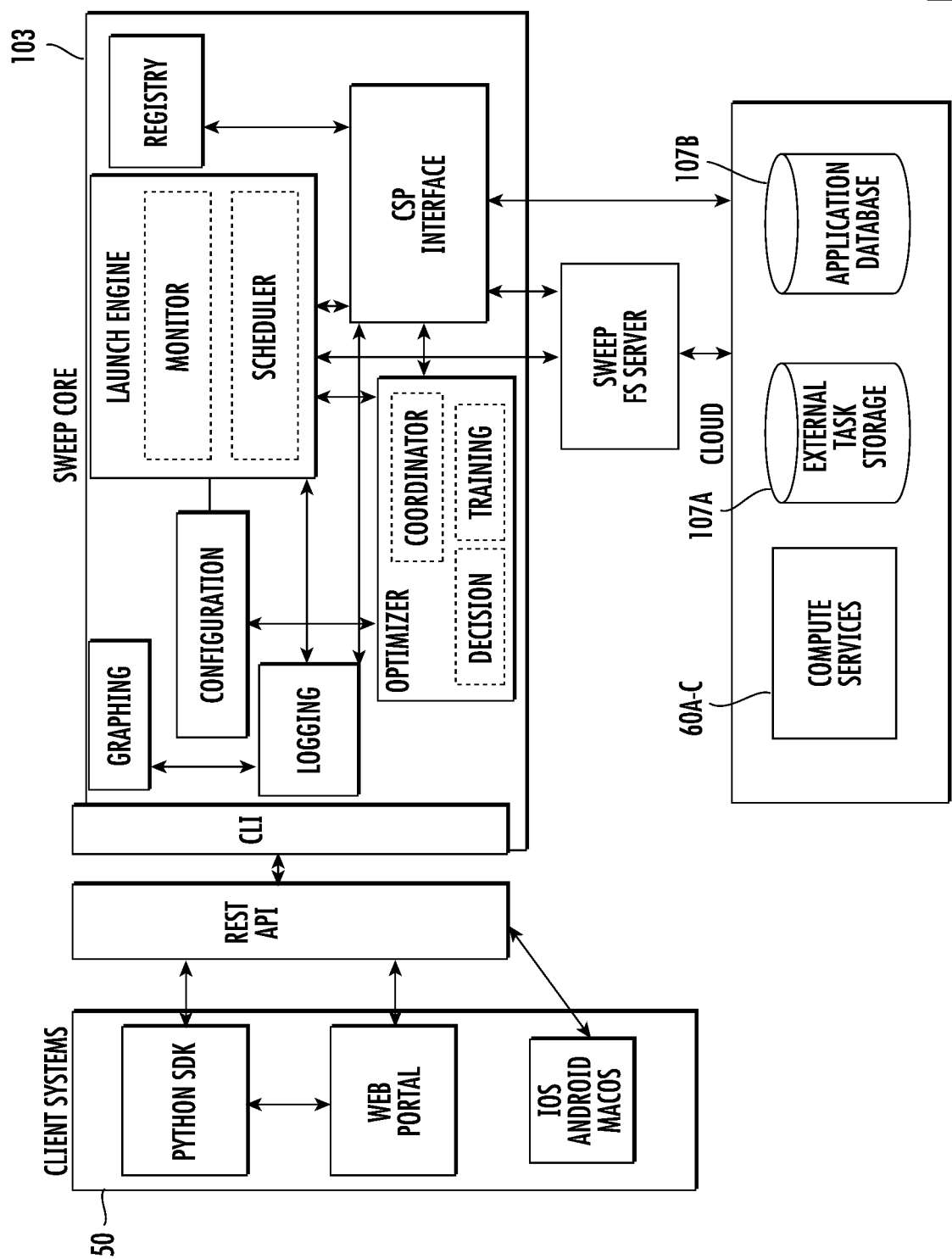
FIG. 2 depicts a block diagram of an example workflow management system according to example embodiments of the present disclosure.

FIG. 2 depicts a block diagram of an example workflow management system according to example embodiments of the present disclosure. In particular, FIG. 2 shows a more detailed diagram of an example workflow enablement and execution platform 103 that is in communication with example client systems 50 (e.g., via an API) and in communication with various cloud resources such as CSPs 60a-c and cloud storage 107a-b (e.g., via a CSP interface, a CSP interface in communication with a SWEEP FS server, etc.).

In particular, as illustrated in FIG. 2, in some implementations, the workflow platform 103 can contain a registry system. The registry system can handle the forwarding of task information to one or several cloud service providers 60a-c on which the task may be executed when a workflow containing the task is launched. In some implementations, the registry system can handle the forwarding of task information to one or several cloud service providers 60a-c via a SWEEP FS server. The registry system can also handle the registering of tasks and workflows in the internal database of the system (e.g., 107b).

In some implementations, the workflow platform 103 can include a launch engine that handle the launch of workflows that have been registered in the system. A scheduler process can govern the task execution configuration of tasks. The execution configuration of a task may include several properties such as the time to launch the task, the cloud provider on which to execute it and how much memory or compute resources are allocated to it.

Figure 4:
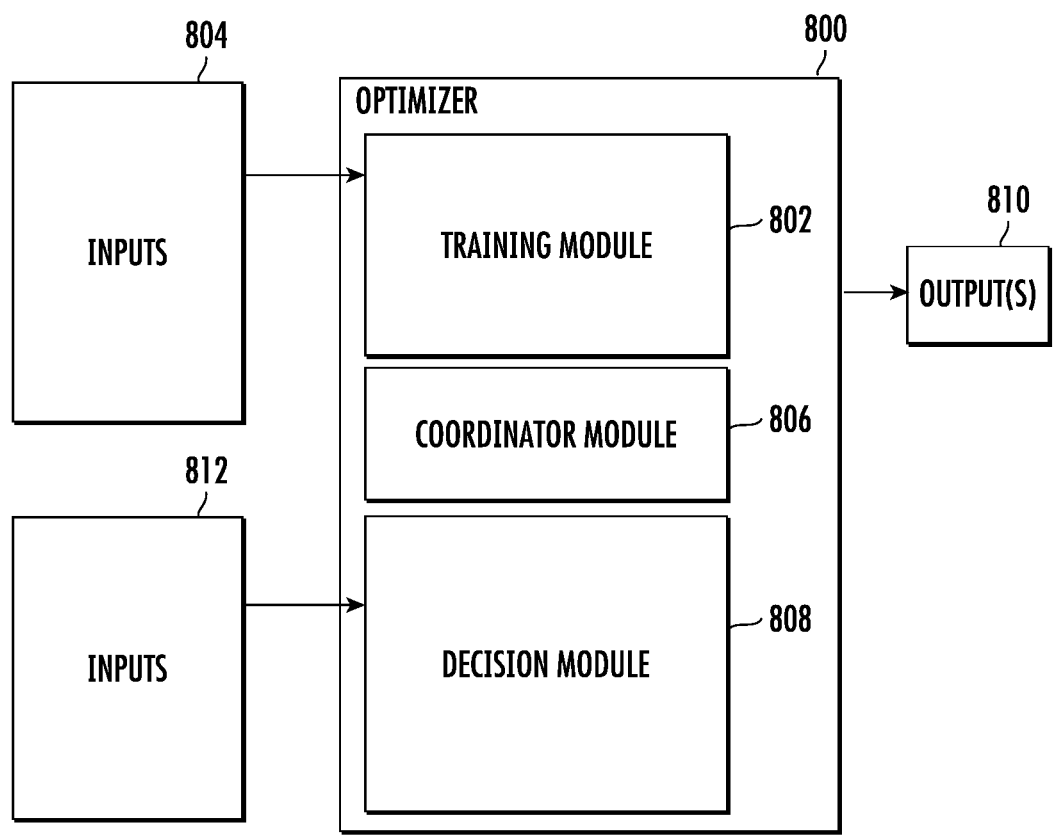
FIG. 4 depicts a block diagram of an example optimizer system according to example embodiments of the present disclosure.

The task execution configuration may be informed by an optimizer system, e.g., as described in more detail with regard to FIG. 4. The launch engine can also contain a monitor process that monitors the current state of the workflow at given time intervals and makes available the information to the user. The monitor process can also save statistics about the launch to the internal database.

In some implementations, the workflow platform can include a configuration system that can act as an intermediary unit between the launch engine and the optimizer system. The configuration system can manage the training of the machine learning models in the optimizer system based on the available information and upon request from the launch engine the configuration system can make decisions regarding task execution configurations. The configuration system may be informed by the machine learning models of the optimizer system as well as other data including user-specified settings as well as information from CSPs.

The registry system, the launch engine, and the optimizer system can communicate with external cloud services via a cloud provider interface. The cloud provider interface can contain functionality to abstract away differences between different cloud providers and external storage systems. The cloud provider interface can manage the execution services provided by different cloud providers and implement a common interface for task execution. It can also provide an interface to maintain a system database utilizing one or several external storage services. In some embodiments, it may also manage an interface for intermediary data storage possible to be used by workflow tasks. In some configurations, the launch engine and the cloud provider interface can communicate with external cloud services via a SWEEP FS server.

Figure 3:
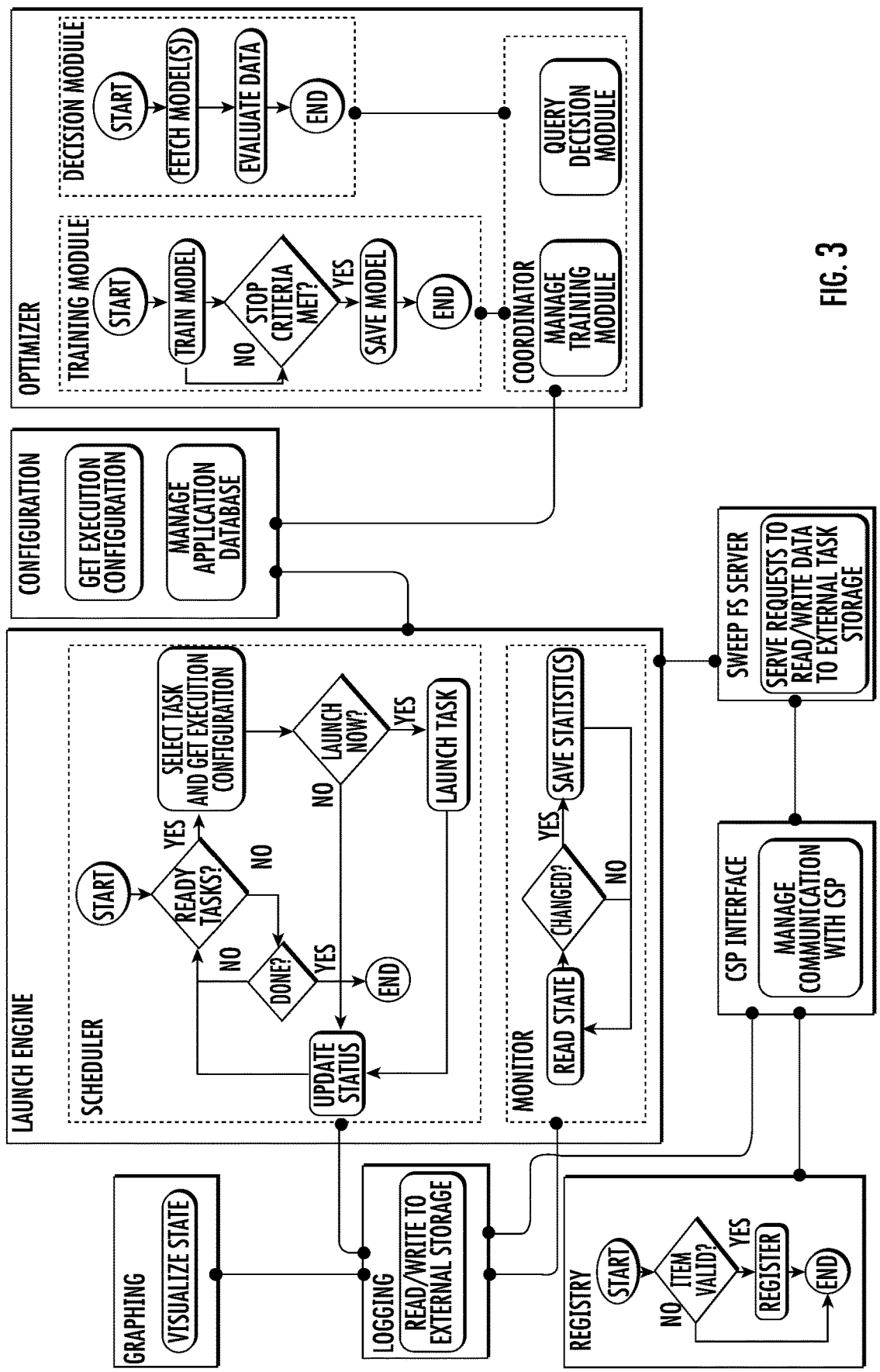
FIG. 3 depicts a block diagram with internal flowcharts showing example operations performed by example subsystems of an example workflow management system according to example embodiments of the present disclosure.

FIG. 3 depicts a block diagram with internal flowcharts showing example operations performed by example subsystems of an example workflow management system according to example embodiments of the present disclosure.

FIG. 4 depicts a block diagram of an example optimizer system according to example embodiments of the present disclosure. In particular, FIG. 4 shows a more detailed diagram of an example optimizer system 800 that is in communication with a configuration system that can act as an intermediary unit between the launch engine and the optimizer system as well as a with external cloud services via the cloud provider interface.

In some implementations, the optimizer system 800 can perform an initial check to determine whether machine learning resources should be used to generate configurations for the task or whether other heuristics should be used. For example, the optimizer system can determine (e.g., based on historical observations) whether the amount of resources to be allocated to perform ML-based inference will be greater or less than the expected gains from using the ML-based inference.

The optimizer system 800 can provide information that the launch engine may use in making decisions regarding task execution configurations. The optimizer system 800 can include and maintain one or more machine learning models (e.g., any of the models described herein) that are trained on data that may be derived from past executions of the same or other workflows, user-provided information, as well as cloud provider data. In some embodiments, the machine learning models may comprise those for optimization of sequential decision problems that may be solved using reinforcement learning techniques based on methods including, but not limited to, deep neural networks and random forest-based models. In some embodiments, the machine learning models may also include methods for solving parameter optimization problems such as gaussian processes.

The optimizer system 800 can include a training module 802 (e.g., as described with reference to FIG. 1A). In particular, the training module 802 may contain several different models (e.g., regression model, deep reinforcement q-learning model as described in FIG. 5, etc.) that have learned the relationship between different combinations between predictors and responses from possible inputs 804 (e.g., predict runtime, cost of a particular configuration, optimal configuration, etc.). The regression model in particular may be implemented in the training module 802. For example, the regression model may utilize the equation $y_i = b_0 + b_1 X_i + e_i$ wherein a predictor X may be CSP, RAM allocated, CPU allocated, time of day, or any other suitable predictor. A response y may be runtime.

More particularly, data stored in the SWEEP internal database may be used to train models. Furthermore, the training module 802 may contain a hierarchy of models. For instance, the hierarchy of models may depend on what data is stored. For example, the models may be informed by all runs of a particular task configuration. As another example, the models may be informed by all runs of a particular workflow. As yet another example, the models may be informed by all runs performed over all workflows by SWEEP.

Moreover, SWEEP may also annotate the run statistics stored in the internal database with informative tags that can be used by the machine-learning models in the training module 802. In particular, annotations or tags may be used as predictors in the models (e.g., a task performs a certain category of work, a task runs a certain software, a task is TO, a task is computer-intensive, etc.), or to subset the training data to create more specific models. Possible inputs 804 to the training module 802 can include, but are not limited to: CSP used, region, CPU allocation, RAM allocation, disk allocation, external memory location, day, time, image ID, function ID, workflow ID, runtime, CPU used, RAM used, disk used, number of failures, task input, workflow input, SWEEP-internal annotations, etc.

The optimizer system 800 can include a coordinator module 806. In particular, the coordinator module 806 may manage communication between the optimizer system 800 and the rest of SWEEP. More particularly, the coordinator module 806 can receive request(s) for execution configurations. The coordinator module 806 can decide what existing models are suitable for use for a particular request. The coordinator module 806 can decide to train a new model for a particular request. The coordinator module 806 can manage one or several continuously trained models and may request state information of a run from a run manager. The coordinator module 806 can query a decision module 808 for a suggested execution configuration based on the selected models and current information from CSPs (e.g., current costs, Service Level Agreement(s) (SLAs), etc.). The coordinator module 806 may feed additional information to the decision module 808 (e.g., time of day to execute tasks, user-defined constraints or preferences, etc.).

The optimizer system 800 can include the decision module 808. In particular, the decision module 808 can be implemented in multiple ways to suggest an execution configuration for a particular task. For example, the decision module 808 can be implemented with one or more models from the training module 802, for example, to suggest execution configuration with regards to how to use the models of the training module to make a decision about run configuration for a task. As another example, the decision module 808 can be implemented with user-defined constraints or preferences as possible inputs 812 (e.g., runtime, CSP availability, cost, etc.). As another example, the decision module 808 can be implemented with regards to interpretation of model results (e.g., if runtime is predicted, what would the corresponding cost be for the given CSP). As yet another example, the decision module 808 can be implemented with one or more decision-making algorithms (e.g., ensemble learning algorithms, weighted-sum model algorithms, etc.) to make decisions based on results of the one or more decision-making algorithms, wherein the decision-making algorithms may be trained models from the training module 802.

The optimizer system 800 can formulate multiple outputs 810. Outputs 810 for the optimizer system 800 can include CSP, RAM allocation, CPU allocation, etc.

Figure 5:
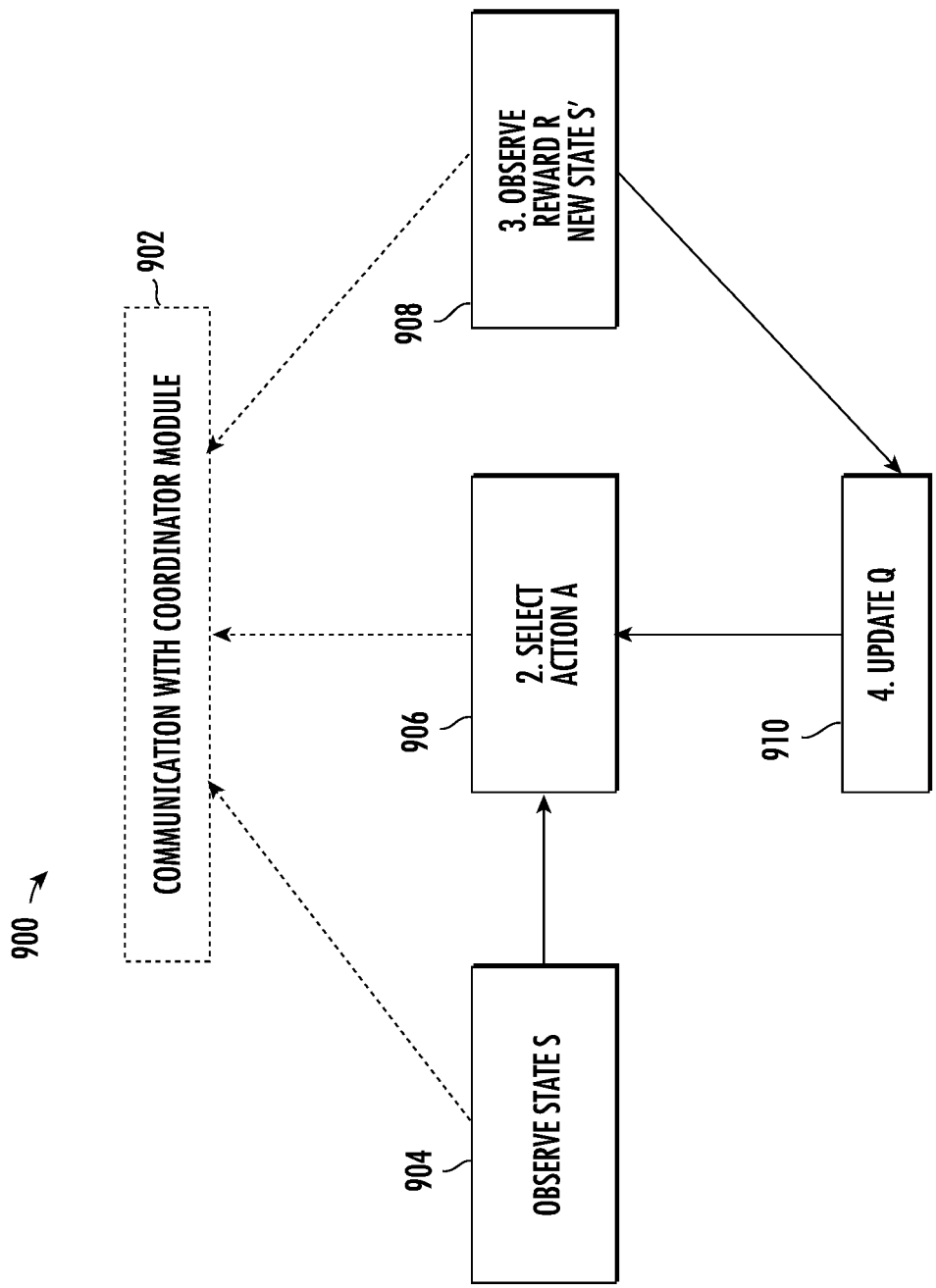
FIG. 5 depicts a block diagram of an example deep reinforcement q-learning model according to example embodiments of the present disclosure.

FIG. 5 depicts a block diagram of an example deep reinforcement q-learning model according to example embodiments of the present disclosure. In particular, FIG. 5 shows a more detailed diagram of an example deep reinforcement q-learning model 900 that may be in communication 902 with the coordinator module 806 or the decision module 808 via the coordinator module 806 within the optimizer system.

In some implementations, the deep reinforcement q-learning model may observe an initial state s 904 wherein s can refer to a vector $s_i$ for every task i of the workflow containing configurable parameters (e.g., CPU allocated, memory allocated, CSP, etc.) or metrics (e.g., task state, number of retries, average CPU utilized, average memory utilized, task runtime, etc.). The deep reinforcement q-learning model may communicate 902 with the coordinator module 806 at this point of the process.

The deep reinforcement q-learning model may select and perform an action a∈A from the possible actions 906. The action may be selected randomly or by selecting a=$\max_a Q$(s, a'). In particular, for every configurable parameter of every task, an operation may be defined to modify it. Specifically, the possible modifications are dependent on constraints defined by the user or the SWEEP platform, available CSPs, CSP offerings, as well as other potential parameters wherein the set of configurable parameters may change over time. For example, finished tasks can become static and may not have any configurable parameters. The deep reinforcement q-learning model may communicate 902 with the coordinator module 806 at this point of the process.

The deep reinforcement q-learning model may observe a reward r and a new state s' resulting from the action a taken in state s 908. In particular, the reward function may in some example implementations be proportional to the average cost per runtime unit per task in the entire workflow. Specifically, in some implementations, the model may learn to minimize the total average task runtime cost, by means of balancing the minimization of runtime, selecting optimal CSPs and configurations, and avoiding overhead due to delays, errors, and retries of tasks. The deep reinforcement q-learning model can, in some implementations, use q-learning methods to learn what actions to take under what circumstances. The quality of a state-action pair combination can be represented by a function Q:S×A→R. A. A convolutional neural network can, in some implementations, be used as an approximator for Q. The input of the network can be the state while the output may be the q-value for all possible actions. The deep reinforcement q-learning model may communicate 902 with the coordinator module 806 at this point of the process.

The deep reinforcement q-learning model may update the weights in the neural network that approximates Q 910. In particular, updating the weights in the neural network that approximates Q 910 includes defining a training target wherein defining a training target includes $$tt = \begin{cases} r & \text{if } s' \text{ terminal} \\ r + \gamma \max_{a'} Q(s', a') & \text{otherwise} \end{cases}$$

wherein γ may be a discount factor. More particularly, updating the weights in the neural network that approximates Q includes updating weights by performing stochastic gradient descent with loss=(tt−Q(s, a)$^2$) The deep reinforcement q-learning model may report the updated Q to the action selection point of the process 906.

Example Machine-Learned Models

Figure 6:
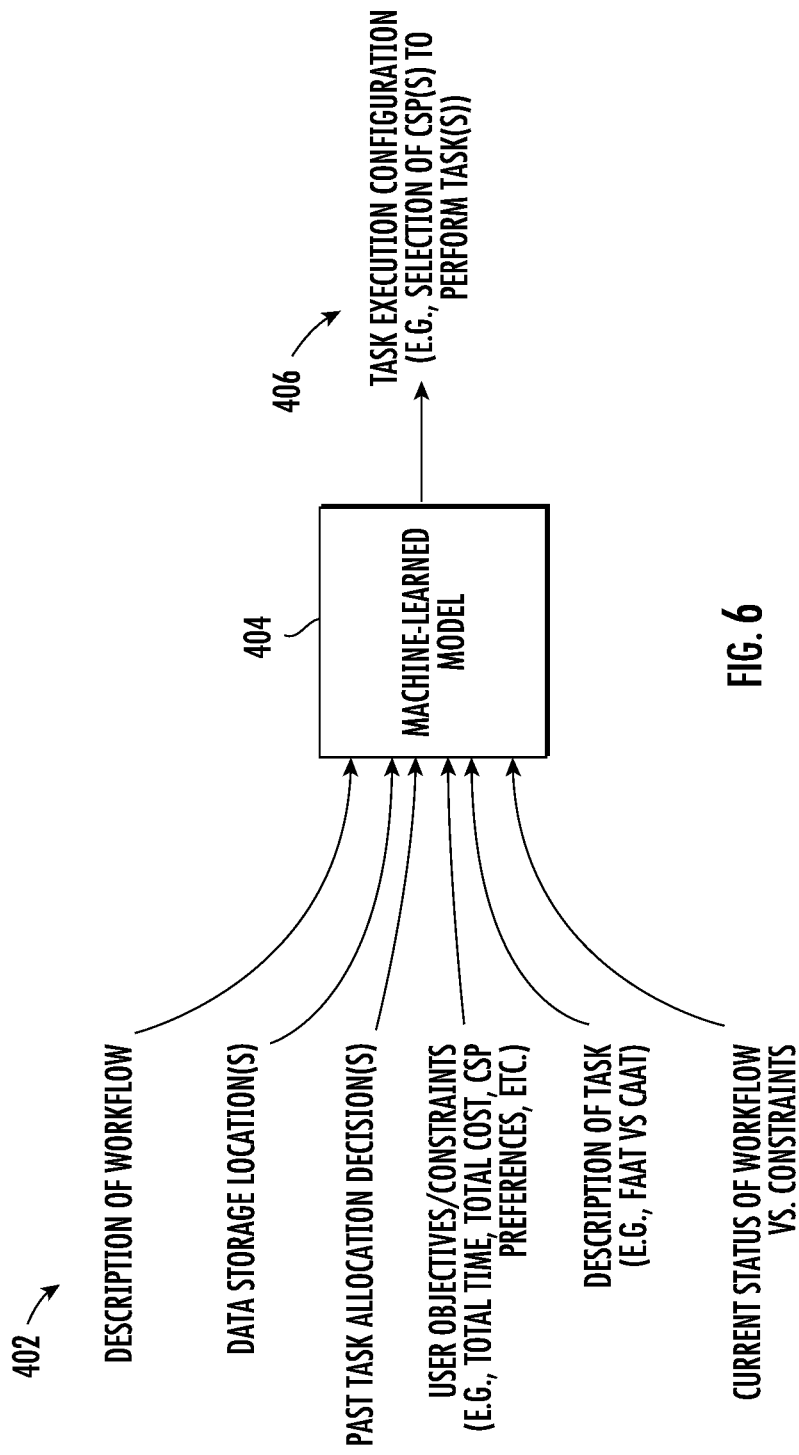
FIG. 6 depicts an example machine-learned model according to example embodiments of the present disclosure.

FIG. 6 depicts an example machine-learned model 404 according to example embodiments of the present disclosure. As examples, the 404 can be otherwise include various machine-learned models such as a random forest model; a logistic regression model; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

The machine-learned model 404 can be trained or otherwise configured to receive and process a set of input data 402 to predict a task execution configuration 406. The set of input data 402 can include some or all of the following information: a description of the workflow; a description of where any data that needs to be accessed to perform the task is stored; a description of past task allocation decisions (e.g., previous tasks in the same execution of the same workflow); a description of any user-specified objectives constraints such as a maximum runtime, a maximum cost, a preference for use of a certain CSP; a description of the task (e.g., whether the task is a function as a task (FaaT), container as a task (CaaT), or other; a description of a current status of the workflow (e.g., current cumulative cost vs. max total cost, current workflow execution time vs. max time, etc.); and/or other information.

Based on such input(s), the machine-learned model 404 can predict the task execution configuration 406. The task execution configuration 406 can identify one of a number of possible cloud service providers (CSPs) to execute the task; describe a timing of the execution of the task and/or an amount of memory and processing resources to allocate for the execution of the task; and/or other characteristics of execution of the task. For example, the amount of memory and processing resources specified by the task execution configuration 406 can include a type of memory or processing resource that is requested from the CSP. For example, the task execution configuration 406 may request a certain number of CPUs, or a certain number of GPUs, or a certain number of Tensor Processing Units (TPUs), etc.

The machine-learned model 404 can leverage the ability to learn (non-linear) relationships and patterns between the inputs and outputs. As one example, the machine-learned model 404 can learn to provide configurations for tasks based on the data storage location. For example, the model 404 can learn to allocate tasks to CSPs that will have the lowest latencies when accessing data from the specified data storage location. As another example, the machine-learned model 404 can learn to provide configurations for tasks based on task-specific costs. For example, certain tasks may have a different costs for different CSPs. The model 404 can learn and leverage these relationships between task type and CSP-specific cost. As another example, the machine-learned model 404 can learn to provide configurations for tasks based on dynamic cost or pricing patterns exhibited by CSPs. For example, the model 404 can learn patterns exhibited by CSPs for costs vs. time of day, day of the week, etc. For example, the model 404 can learn patterns exhibited by CSPs for costs over time (e.g., a certain CSP may have a first cost versus time curve that maintains a reduced cost until a threshold number of tasks are performed while another CSP may have a second cost versus time curve that exhibits a reduced cost only after a threshold number of tasks are performed). As another example, the model 404 can learn patterns exhibited by CSPs for costs and/or latency over time as part of a warmup period. For example, certain CSPs may have reduced latency after they have performed a certain number of tasks in a workflow and have "warmed up" to accessing data from a certain location or performing a certain type of task. Thus, the model 404 can learn and leverage any of these patterns to provide an optimized task execution configuration 406 for one or more tasks.

The machine-learned model 404 can operate to generate a specific prediction for a single task or jointly for a group of tasks (e.g., all tasks included in a workflow). The machine-learned model 404 can be used to generate the task execution configuration 406 in real-time as the workflow is being executed (e.g., to generate the task execution configuration 406 for a task at the time such task is ready to be performed. Alternatively or additionally, the machine-learned model 404 can be used to generate the task execution configurations 406 for all tasks included in a workflow prior to execution of any portion of the workflow (e.g., all task assignments are done in advance).

FIG. 5 depicts an example machine-learned model 500 according to example embodiments of the present disclosure. In particular, FIG. 5 illustrates an example recurrent neural network 500 operating over a number of time steps. At the first time step (and optionally at each time step thereafter), the network 500 can receive contextual data (e.g., any of the inputs described with reference to FIG. 6). At each time step, the recurrent neural network 500 can receive a description of a particular task and can process all of the available information (e.g., including hidden state information passed forward from previous time steps) to generate a task execution configuration for the task.

Figure 7:
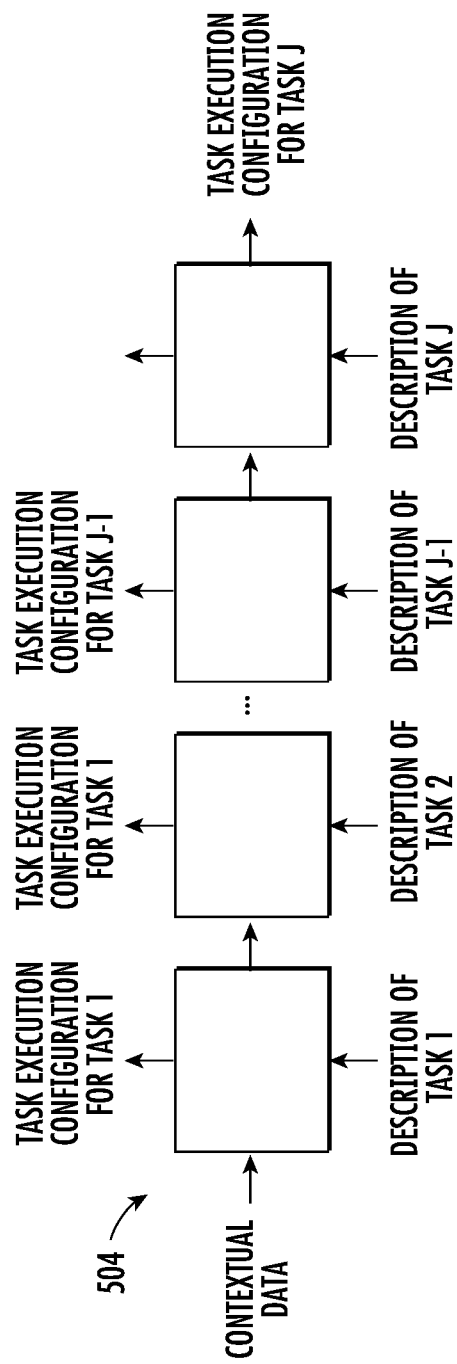
FIG. 7 depicts an example machine-learned model according to example embodiments of the present disclosure.

FIG. 7 depicts an example machine-learned model according to example embodiments of the present disclosure. The model operates over a number of time epochs. At each epoch, the model uses information (e.g., hidden state or latent information) from previous epochs to provide a task execution configuration for a current task.

Figure 8:
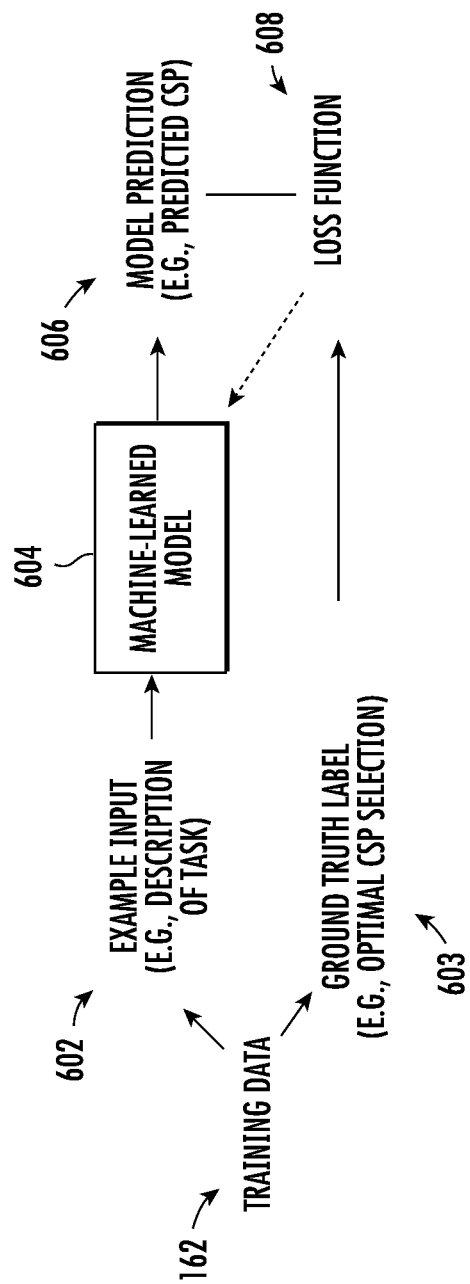
FIG. 8 depicts training of an example machine-learned model using supervised learning according to example embodiments of the present disclosure.

FIG. 8 depicts training of an example machine-learned model 604 using supervised learning according to example embodiments of the present disclosure. In particular, as illustrated in FIG. 8, a set of training data 162 can include a plurality of training examples, where each training example includes an example input 602 (e.g., any of the data described with reference to FIG. 6) and a ground truth label 603 (e.g., an optimal task execution configuration). Based on the example input 602, the model 604 can generate a model prediction 606. A loss function 608 can compare the model prediction 606 to the ground truth label 603. The loss function 608 can be used to learn (e.g., via backpropagation over a number gradient descent iterations) optimal values for the parameters of the model 604.

In some implementations, the labels 603 contained in the training data 162 can be manually generated. In some implementations, the labels 603 contained in the training data 162 can be outputs of the model 604 that resulted in the corresponding workflow satisfying one or more constraints. For example, the model 604 can be used to generate task execution configurations for tasks of a workflow. If performance of such task execution configurations results in the workflow being completed while satisfying certain performance constraints (e.g., cost, time, etc.) then the inputs and outputted task execution configurations can be added to the training dataset 162. If performance of such task execution configurations results in the workflow either failing to be completed or being completed without satisfying the constraints, then the data will not be added to the training dataset 162. In some implementations, the training data 162 can be experimentally generated by running a large number of tasks with various CSPs and collecting data that indicates, for each task, which CSP would be the optimal CSP to select for such task.

Figure 9:
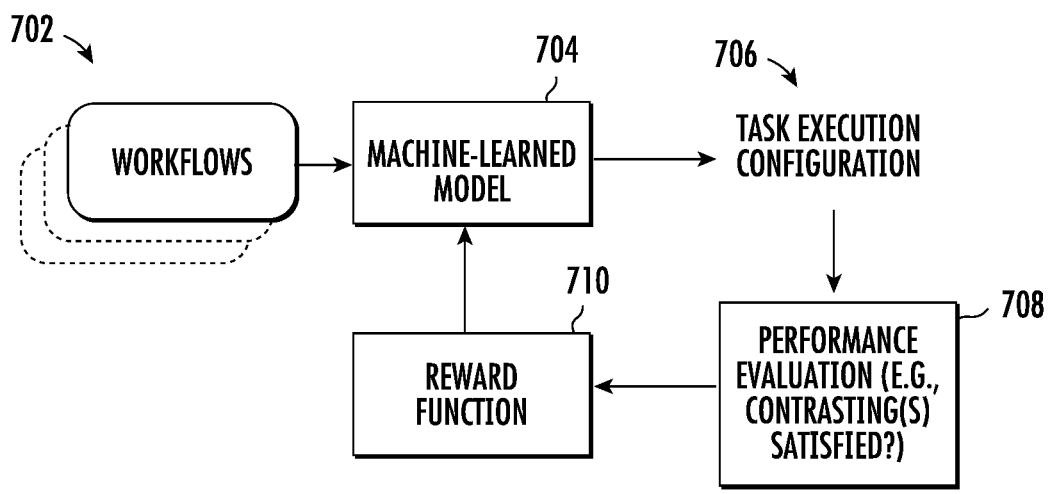
FIG. 9 depicts training of an example machine-learned model using reinforcement learning according to example embodiments of the present disclosure.

FIG. 9 depicts training of an example machine-learned model 704 using reinforcement learning according to example embodiments of the present disclosure. In particular, as illustrated in 704, a machine-learned model 704 can receive and process a workflow 702 to generate a task execution configuration 706 for the workflow 702. A performance of the workflow 702 executed according to the task execution configuration 706 can be evaluated. For example, it can be determined whether the workflow 702 executed according to the task execution configuration 706 satisfied one or more constraints (e.g., on cost, runtime, etc.). A reward function 710 can generate a reward for the model 704 based on the performance evaluation 708. The values of the parameters of the model 704 can be updated based on the reward generated by the reward function 710.

Example Aspects

Figure 10:
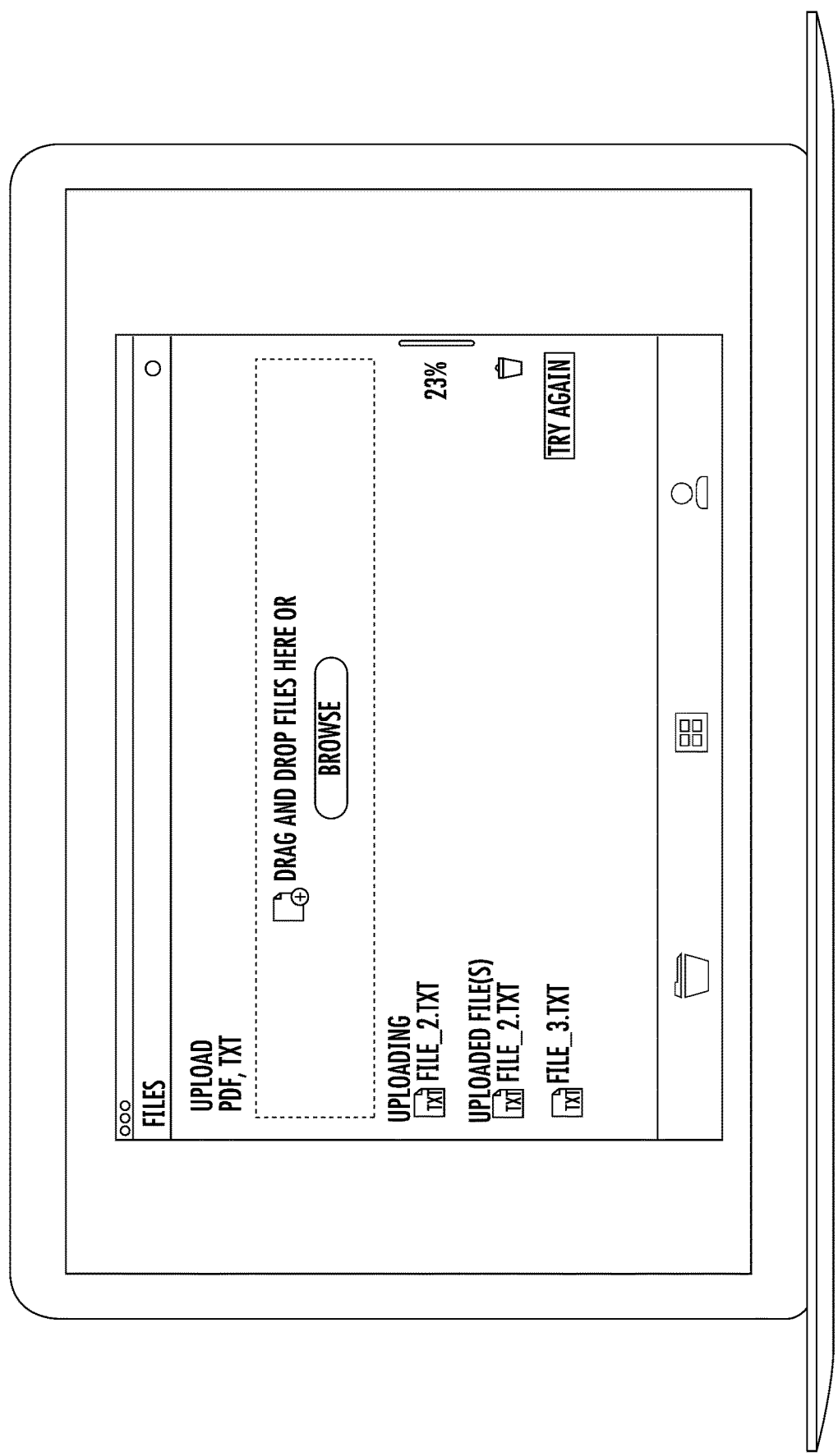
FIG. 10 illustrates a first example interface according to example embodiments of the present disclosure.

FIG. 10 illustrates a first example interface according to example embodiments of the present disclosure. In particular, FIG. 10 illustrates how a user can drag and drop files in order to upload the files to the computing system. More specifically, the user interface can document what file is uploading (e.g., by file name) and can further document what file(s) are already uploaded (e.g., by file name). If a file did not upload correctly the user interface may display a notification indicating that the file did not upload correctly. Moreover, the user interface can display a graphic indicating that the user should try to upload the file again. In particular, the graphic may be clicked to try uploading the file again.

Figure 11:
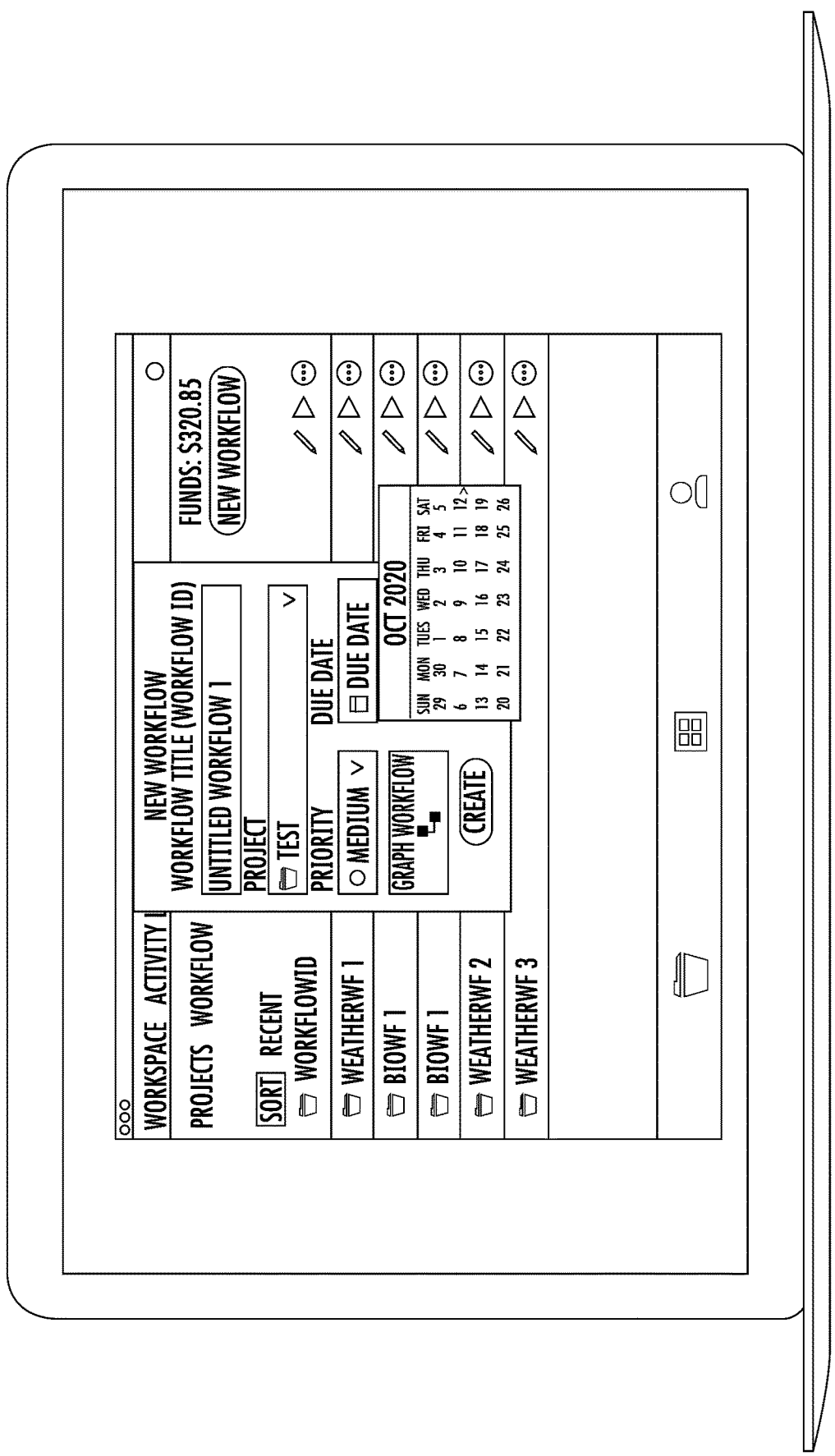
FIG. 11 illustrates a second example interface according to example embodiments of the present disclosure.

FIG. 11 illustrates a second example interface according to example embodiments of the present disclosure. In particular, FIG. 11 illustrates how a user can input a new workflow into the computing system. More specifically, an interface window can appear overlaid on the screen. A user can input a workflow title. A user can input a project category. More particularly, a user can select a project category from a dropdown window. A user can input a priority level of the new workflow. More particularly, a user can select a priority level from a dropdown window. A user can input a due date for the new workflow. More particularly, a user can select a due date from a calendar pop-up. A user can select a workflow style.

Figure 12:
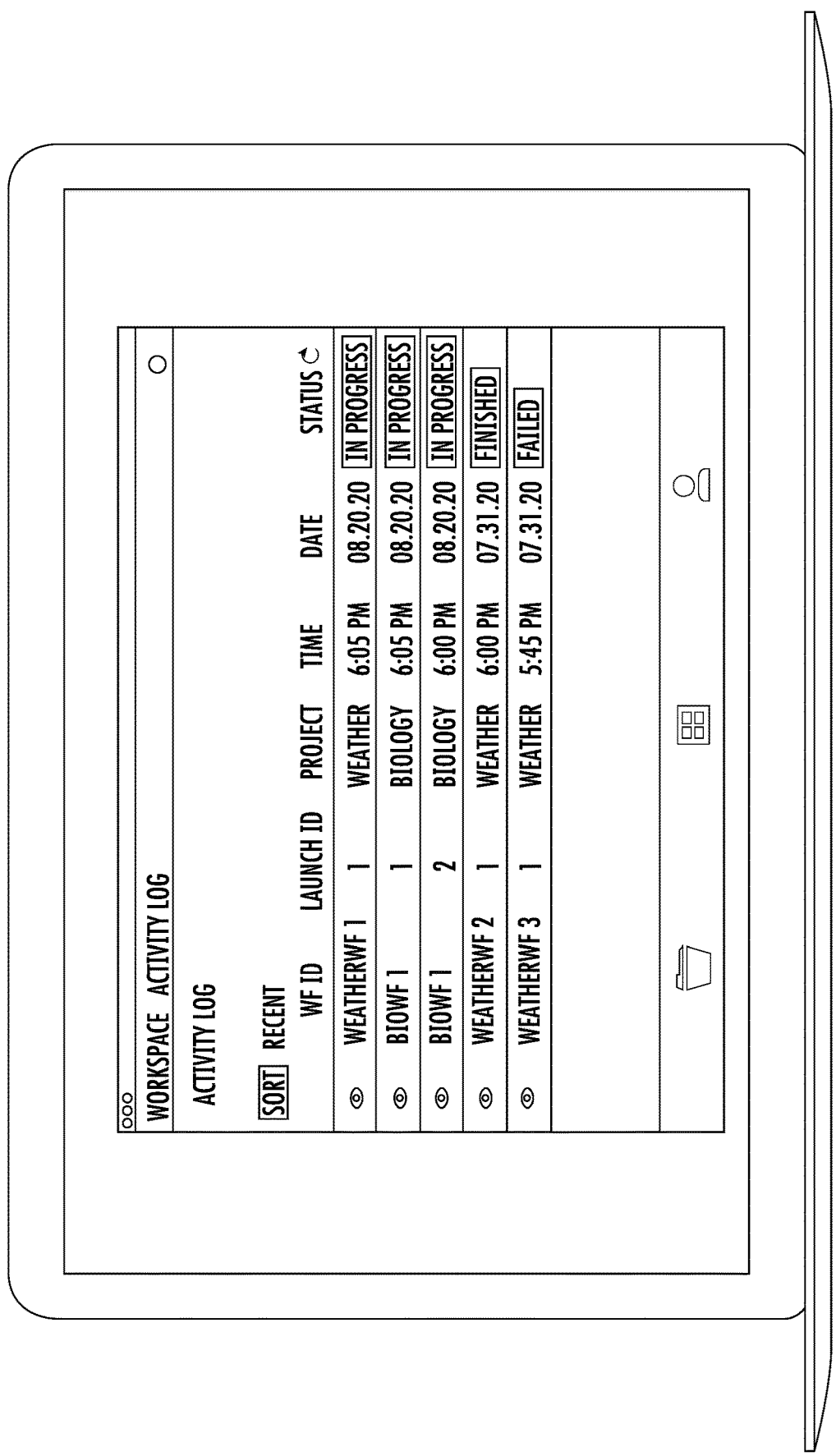
FIG. 12 illustrates a third example interface according to example embodiments of the present disclosure.

FIG. 12 illustrates a third example interface according to example embodiments of the present disclosure. In particular, FIG. 12 illustrates an activity log. The activity log can display one or more workflows (e.g., by workflow identification or workflow title). The activity log can display several characteristics of each workflow displayed (e.g., launch ID, project label, time, date, status, etc.).

Figure 13:
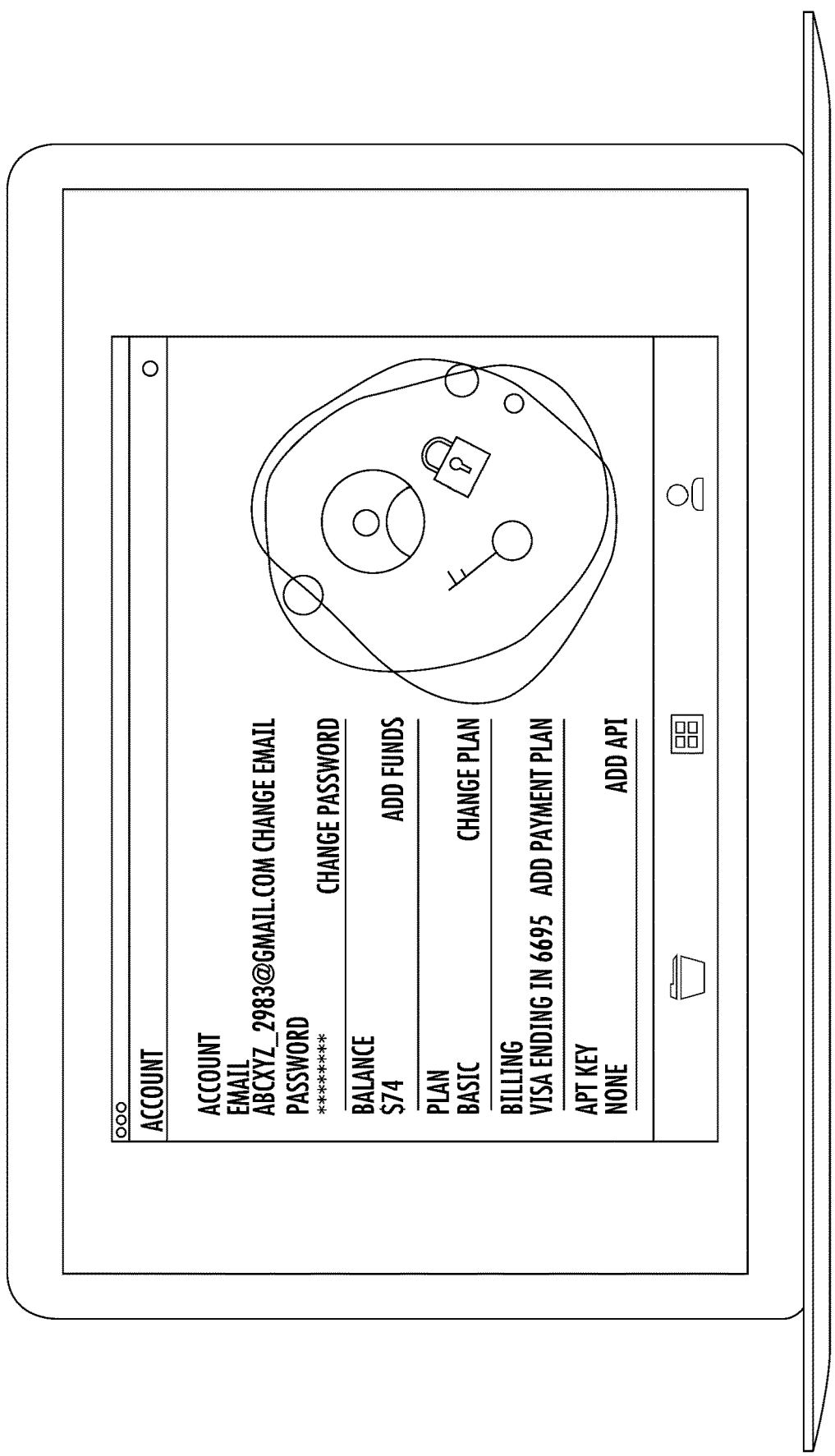
FIG. 13 illustrates a fourth example interface according to example embodiments of the present disclosure.

FIG. 13 illustrates a fourth example interface according to example embodiments of the present disclosure. In particular, FIG. 13 illustrates an account information interface. The account information interface may display information about a user's account (e.g., email attached to account, password, account balance, plan, billing information, API key, etc.). More particularly, any information displayed in the account information interface may have an option for the user to make changes to the information currently saved. Specifically, the user can add more information, subtract information, or alter the information there.

Figure 14:
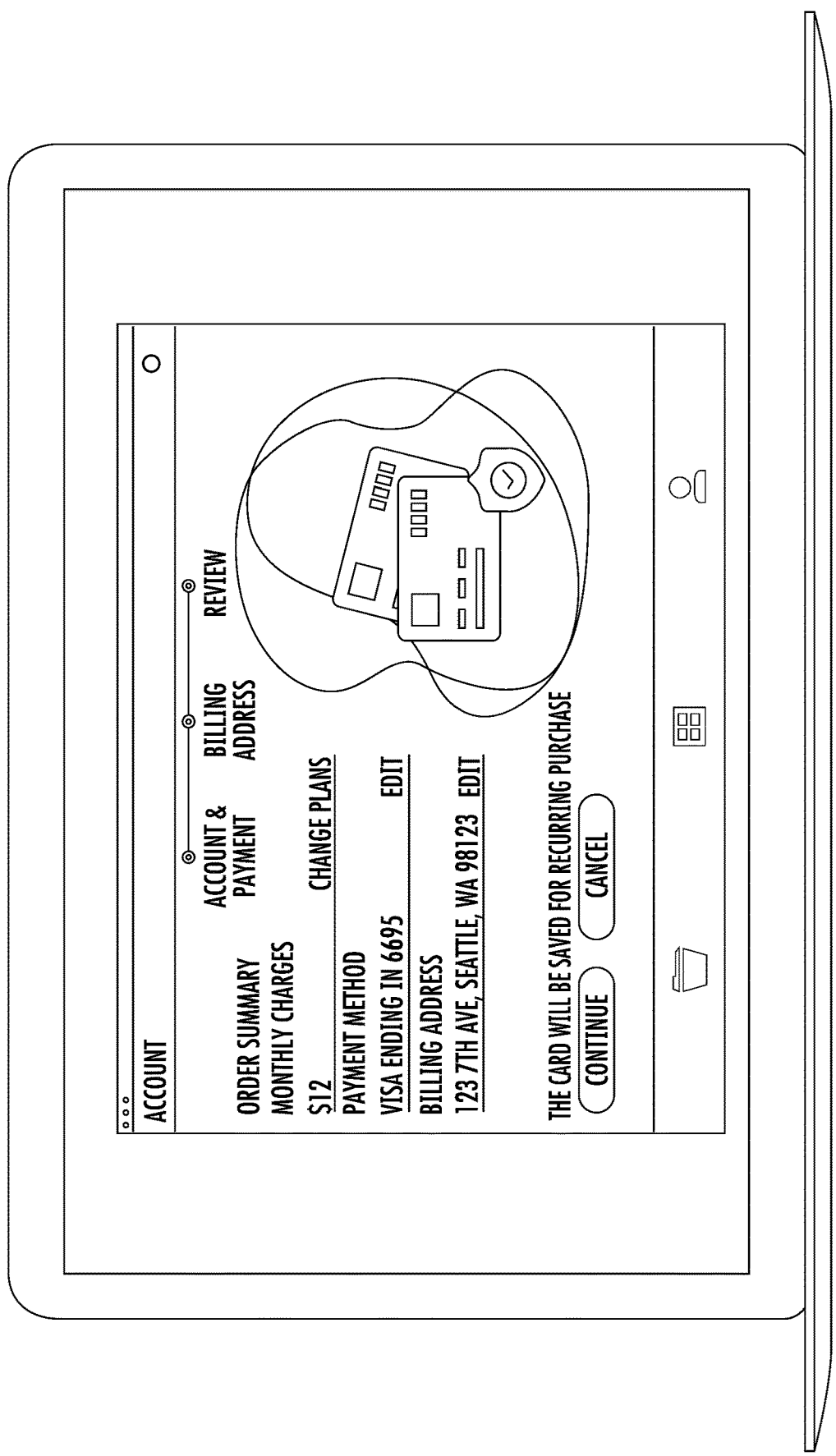
FIG. 14 illustrates a fifth example interface according to example embodiments of the present disclosure.

FIG. 14 illustrates a fifth example interface according to example embodiments of the present disclosure. In particular, FIG. 14 illustrates an order summer interface. The order summary interface can include information including monthly charges (e.g., how much the user will be billed on a monthly basis), payment method (e.g., credit or debit card information), and billing address. More particularly, any information displayed on the order summary interface may have an option for the user to make changes to the information currently saved. Specifically, the user can add more information, subtract information, or alter the information there. Moreover, the order summary interface may include a prompt that asks the user if the computing system can save the payment method information for future transactions, wherein the user can select to allow or not allow this.

Figure 15:
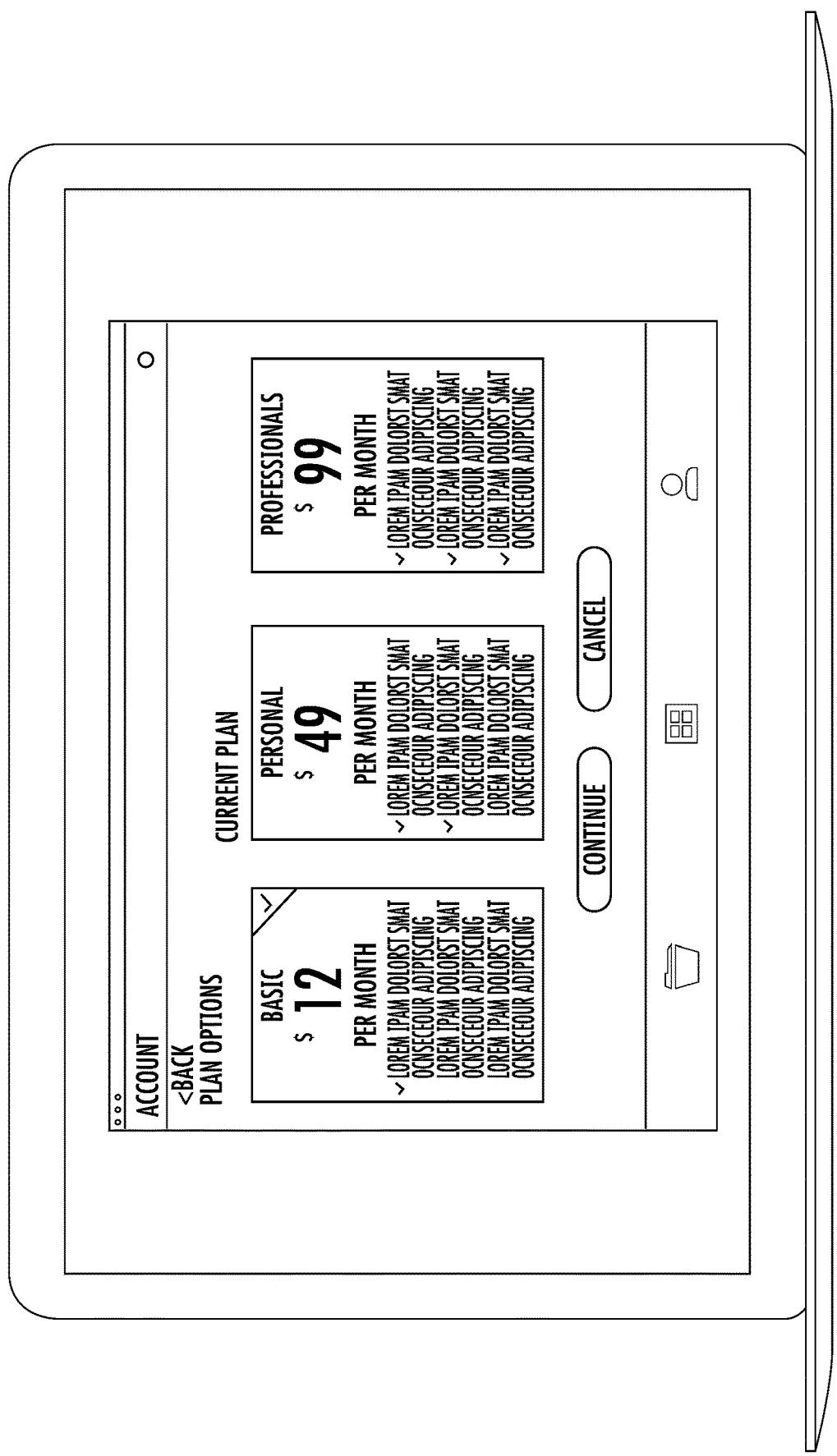
FIG. 15 illustrates a sixth example interface according to example embodiments of the present disclosure.

FIG. 15 illustrates a sixth example interface according to example embodiments of the present disclosure. In particular, FIG. 15 illustrates a plan option interface. The user can determine which plan best suits the user's needs in the plan option interface (e.g., by the plan option interface displaying characteristics of each plan option) and select which plan they would like to purchase. More particularly, the plan option interface may display which plan the user is currently purchasing. If a user selects a plan for purchase, the plan option interface can display which plan the user is selecting. Moreover, the plan interface can provide an option for a user to continue with the purchase or to cancel the purchase.

Figure 16:
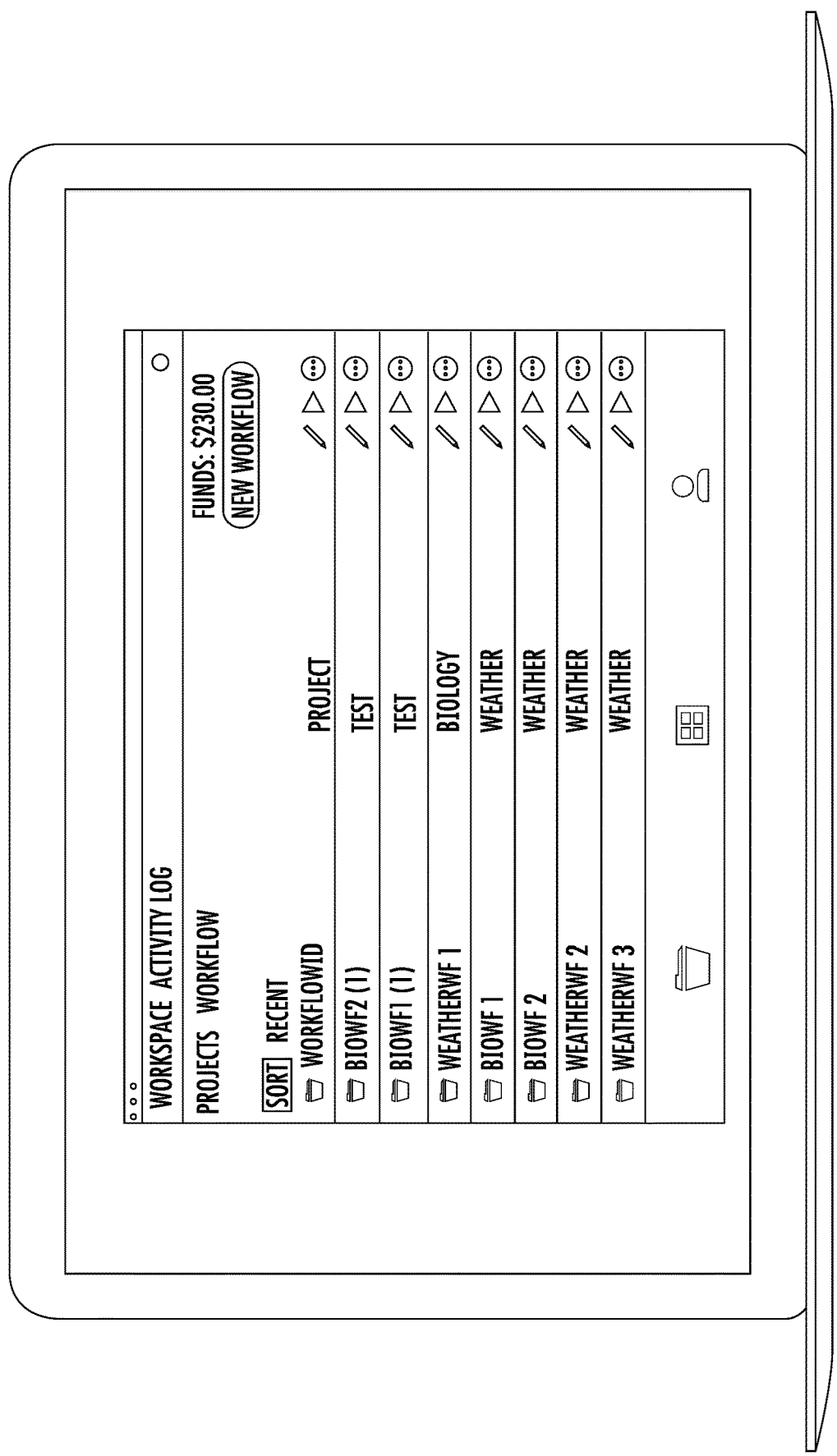
FIG. 16 illustrates a seventh example interface according to example embodiments of the present disclosure.

FIG. 16 illustrates a seventh example interface according to example embodiments of the present disclosure. In particular, FIG. 16 illustrates a workflow overview interface. The workflow overview interface can display one or more workflows (e.g., by workflow identification or workflow title) as well as a category that the workflow has been classified under (e.g., test, biology, weather, etc.). More particularly, the workflow overview interface can provide graphics that a user can interact with (e.g., by clicking) to edit the workflow, play the workflow, or otherwise change workflow settings. Moreover, the workflow overview interface can provide a graphic that a user can interact with to create a new workflow.

Figure 17:
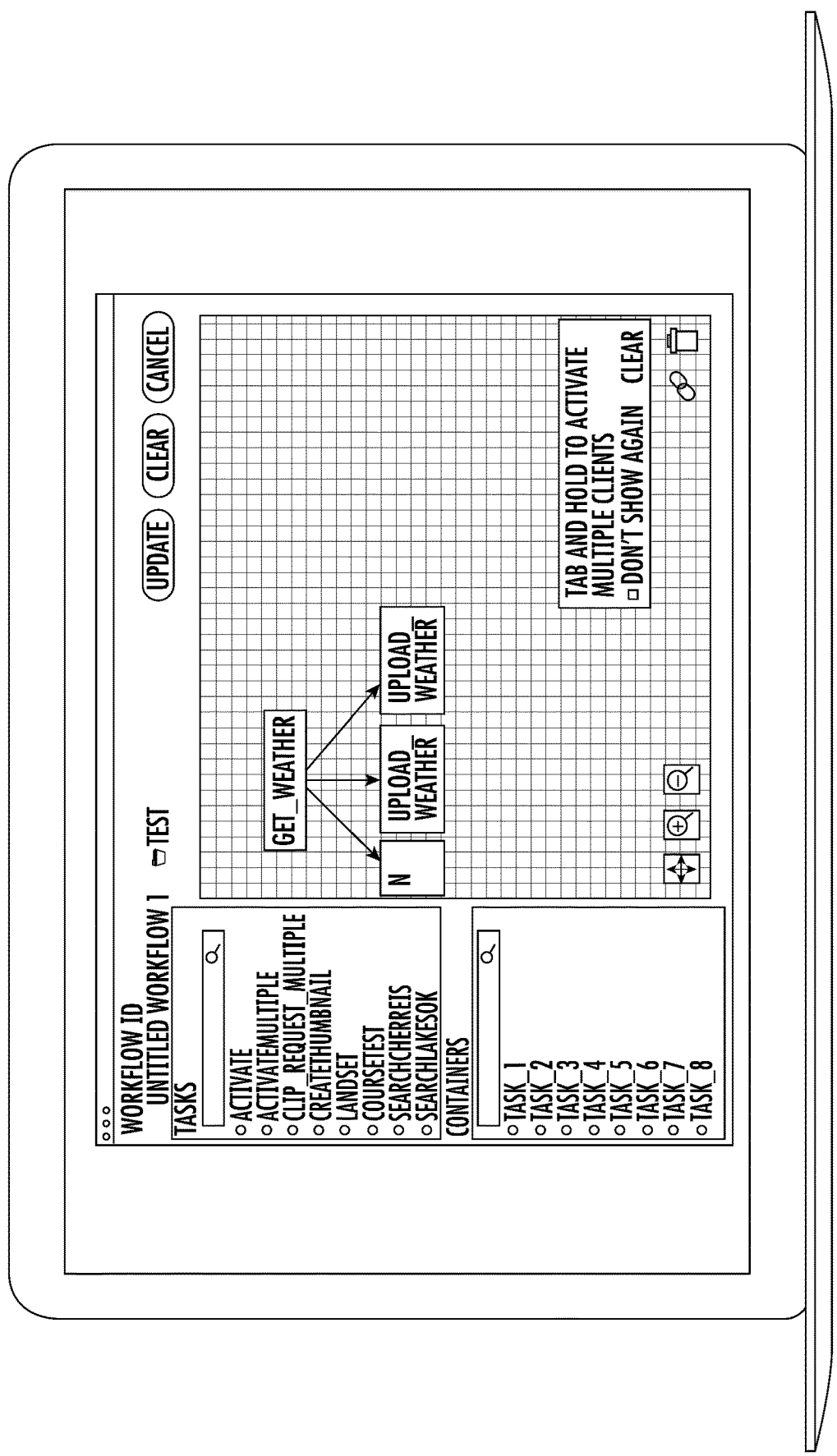
FIG. 17 illustrates a eighth example interface according to example embodiments of the present disclosure.

FIG. 17 illustrates an eighth example interface according to example embodiments of the present disclosure. In particular, FIG. 17 illustrates a workflow interface. More particularly, a user can construct a workflow in the interface displayed. A workflow can be constructed by a graphical outline. The workflow interface can include a list of tasks. The workflow interface can include a list of containers. The workflow interface can further include graphics that a user can interact with to update, clear, cancel, change zoom levels, move, trash, or otherwise interface with the workflow.

Figure 18:
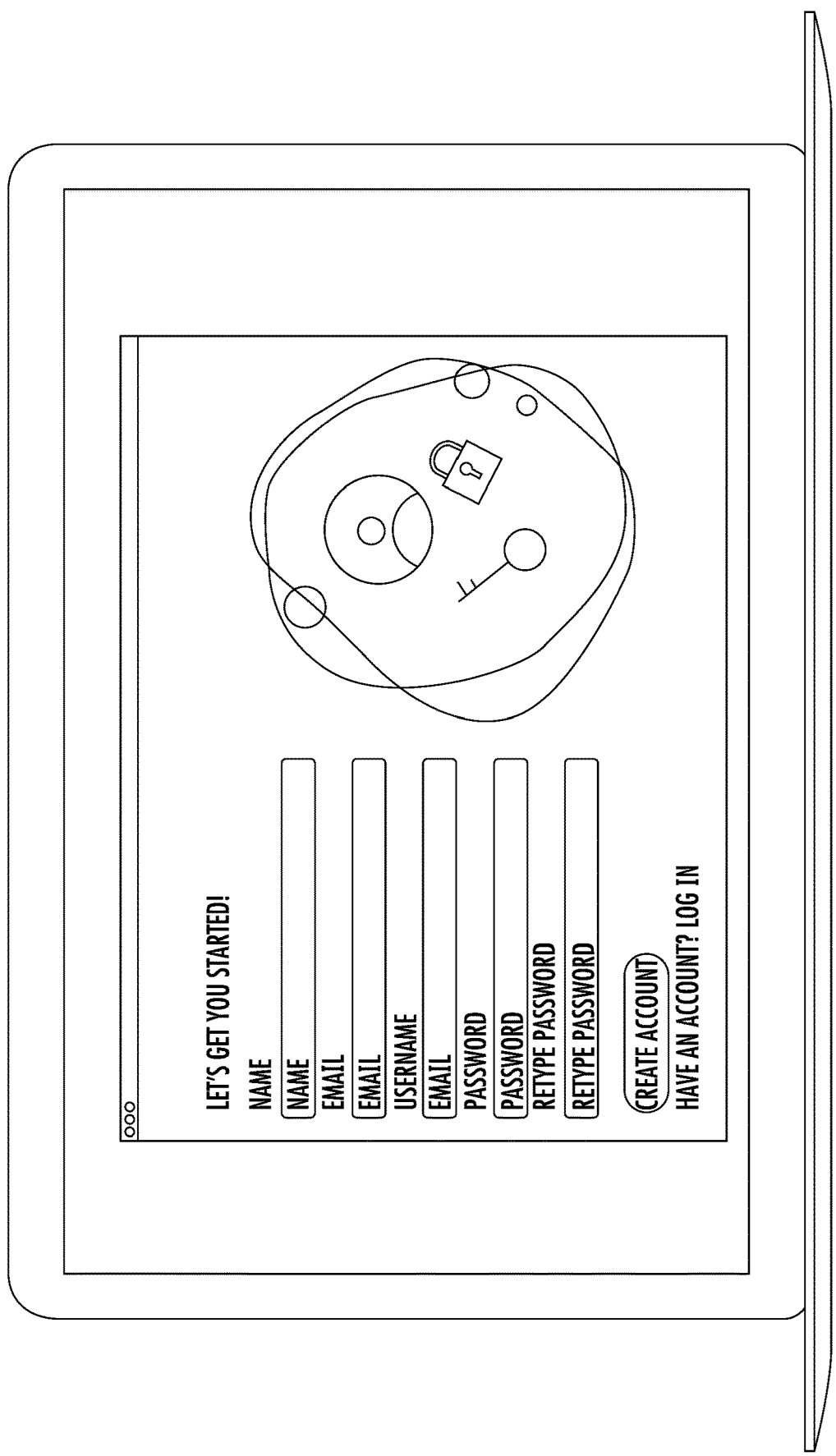
FIG. 18 illustrates a ninth example interface according to example embodiments of the present disclosure.

FIG. 18 illustrates a ninth example interface according to example embodiments of the present disclosure. In particular, FIG. 18 illustrates an introductory interface. More particularly, the introductory interface can have fields for a user to input information to create an account with the computing system (e.g., so that a user can buy a service). Information a user can input to create an account can include a user's name, email, username, password, or any other pertinent information. Furthermore, the introductory interface can have a graphic for a user to interact with to allow a user to log in if a user already has an account with the computing system.

Figure 19:
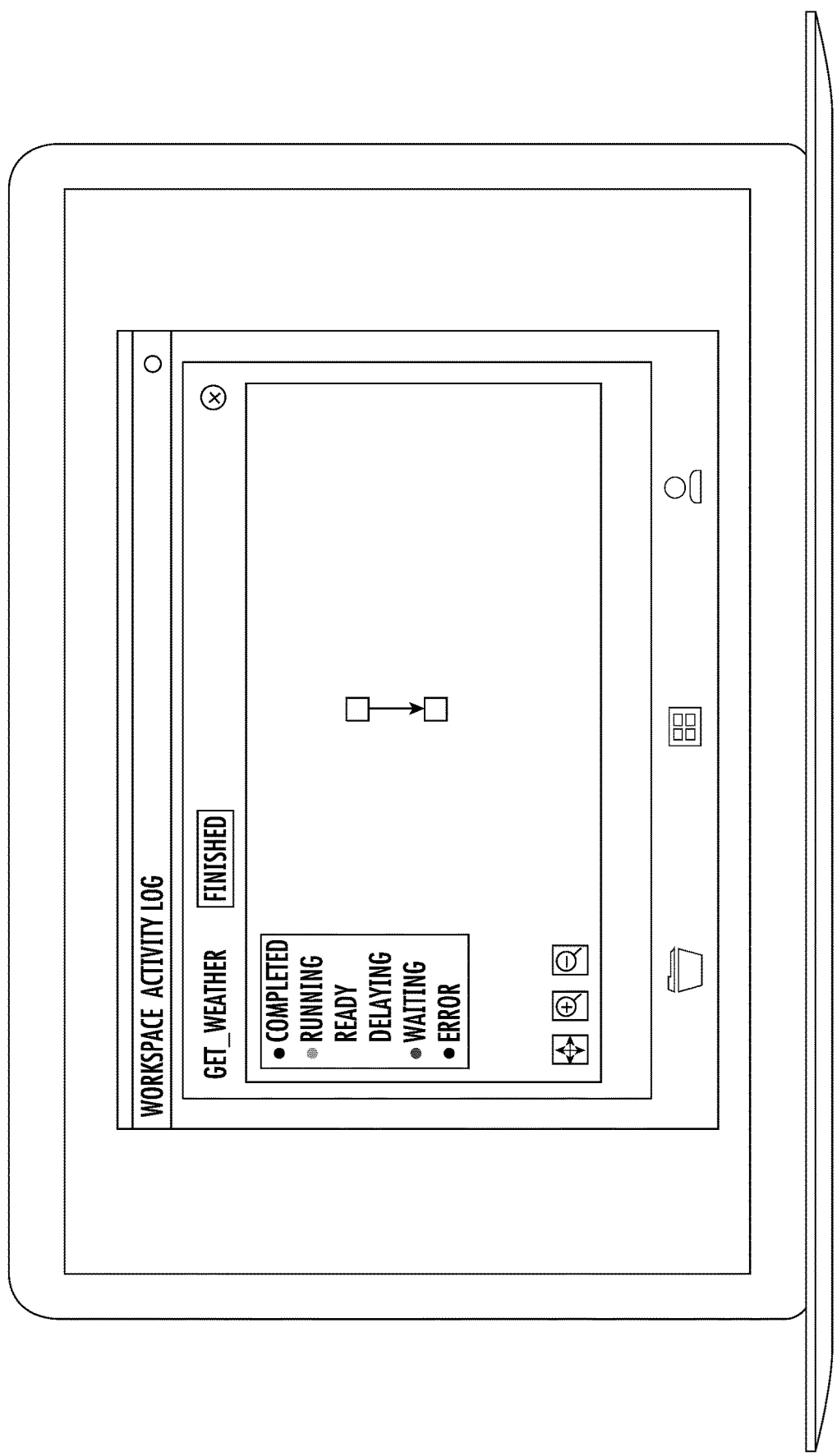
FIG. 19 illustrates a tenth example interface according to example embodiments of the present disclosure.

FIG. 19 illustrates a tenth example interface according to example embodiments of the present disclosure. In particular, FIG. 19 illustrates a workflow completion tracker. More particularly, the workflow completion tracker can display to a user what parts of a workflow are in what completion level of the workflow process (e.g., complete, running, ready, delaying, waiting, error). More specifically, the workflow completion tracker can indicate to a user what completion level a part of a workflow is by color. Furthermore, the workflow completion tracker can display to a user a notification if the workflow is completely finished.

One example aspect of the present disclosure is directed to an artificial intelligence ("AI")-enabled workflow management system ("WMS") configured for running workflows comprising tasks and associated rules for their orchestration on serverless execution platforms of one or more cloud service providers ("CSPs"), comprising: one or more AI-enabled CSP-aware modules in a memory including one or more of the following: a launch engine module, configuration module, and/or an optimizer module, wherein the configuration module, upon execution of the configuration module by one or more components of the launch engine module, is configured to coordinate training for each machine learning ("ML") model of the one or more ML models managed by the optimizer module, and wherein the optimizer module, upon request from the configuration module is configured to train each ML model, decide how to use the models of the training module, and coordinate requests for execution configuration, whereby the configuration module may utilize the predictions along with other data to select task execution configurations in order to optimize a set of metrics that may be defined by a user or the WMS, where a task execution configuration may include information about which CSP to execute a task on, the timing of the execution of the task and the amount of memory and processing resources to allocate for the execution of the task.

In some implementations, the WMS further includes: one or more data access objects ("DAOs") for each ML model comprising a train DAO, a validation DAO and/or a test DAO stored in an application database on external distributed storage and made available by the CSP interface module to the training component of the optimizer module for performing training and evaluation of each of the ML models of the optimizer module, wherein the training component of the optimizer module achieves improvements of the ML models with respect to a cost function defined for each ML model by executing an optimization algorithm on the internal weights and/or parameters of the ML model using data from the train DAO, and using data from the validation DAO to gain performance metrics to be used in making decisions regarding hyperparameter tuning of the ML model, and using data from the test DAO to maintain a set of performance metrics for each ML model that describe the performance of the current version of the ML model.

In some implementations, the configuration module upon request by the launch engine uses pre-defined customer preferences, location of the customer data, time available, time used, dollar amount allocated, dollar amount used and other data and constraints, along with information provided by the predictor component of the optimizer module, to recommend a task execution configuration including the CSP to execute on, the timing of the execution of the task and the amount of memory and processing resources to allocate for the execution of the task.

In some implementations, the configuration module contains functionality to simulate runs of existing workflows by means of data collected from previous runs, user-provided estimates of or constraints placed upon task execution time or resource usage, or estimates obtained by means of heuristic algorithms in order to inform the determination of optimal task execution configurations for the workflow in question, and whereby the configuration module may further launch redundant tasks and workflows with different execution configurations in order to obtain more data for the training and validation of models to improve prediction performance of the ML models of the optimization module.

In some implementations, the optimizer module upon instruction by the configuration module is triggered to initiate a training pass of one or more of the ML models it contains at intervals that may be regular and predefined or governed by the addition of new information to the application database, wherein the optimizer subsystem is configured to execute a validation pass after a pre-defined number of training passes and use validation performance metrics to evaluate a pre-defined condition for the termination of the training process, wherein the optimizer subsystem is further configured to execute a testing pass upon termination of the training process and store test performance metrics along with train and validation performance metrics in the application database.

In some implementations, the WMS adapts over time by making inter-task level tuning to the individual workflow embodiment's execution. Accounts for changing charged costs by CSPs for execution of tasks.

In some implementations, tasks are executed with execution configuration recommended by the optimizer.

In some implementations, the WMS further includes: a graphing module configured to display a dynamic graph for a workflow currently executing or previously having been executed on the WMS.

In some implementations, the WMS further includes: a monitor component of the launch engine module that monitors changes in the state of a workflow in process of launching and collects additional metrics and statistics to store in the application database.

In some implementations, the WMS further includes: a logging module configured to persist the state of the workflow launch process along with any additional metrics generated by the monitor component of the launch engine module as well as the information regarding the task execution configurations selected and store the information in the application database in a means that makes it accessible to be used as labeled training and validation data to be used by the training component of the optimizer module.

In some implementations, the WMS further includes: a registry module by which task and workflow definitions can be committed to the WMS, including a parser of user-defined tasks and workflows defined by means of a data serialization language according to a predefined formalism, whereby valid tasks and workflow definitions committed are registered to the application database.

In some implementations, the WMS (e.g., the registry module) can provide pre-defined workflows which users can execute on the platform. For example, the WMS might have chromosome level generic workflows that end-users or customers can execute with their own datasets. Thus, the WMS can include and/or provide access to an online library of generic workflows that end-users can avail, and new ones which are made available over time.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for execution of serverless workflows, the method comprising:
   obtaining, by a computing system comprising one or more computing devices, a workflow that comprises a plurality of tasks; and
   for at least one of the plurality of tasks:
      inputting, by the computing system, data descriptive of the task into a machine-learned model configured to receive and process the data descriptive of the task;
      receiving, by the computing system and as an output of the machine-learned model, a task execution configuration for the task, wherein the task execution configuration selects for execution of the task one of a number of available serverless cloud service providers; and
      communicating, by the computing system, with the selected serverless cloud service provider to cause execution of the task by the selected serverless cloud service provider.

2. An artificial intelligence ("AI")-enabled workflow management system ("WMS") configured to enable execution of workflows comprising tasks and associated rules for their orchestration on serverless execution platforms of one or more cloud service providers ("CSPs"), the WMS comprising:
   one or more subsystems comprising computer-executable instructions stored in a non-transitory computer-readable memory;
   wherein the one or more subsystems comprise at least an optimizer subsystem that is configured to employ one or more machine-learned (ML) models to generate predictions used by the WMS to select a task execution configuration for one or more tasks included in a workflow;
   wherein the task execution configuration comprises information descriptive of one or more of:
      which CSP to execute the task on,
      a timing of the execution of the task, or
      an amount of memory and processing resources to allocate for the execution of the task.

3. The WMS of claim 2, wherein the one or more subsystems further comprise a launch engine subsystem that is configured to handle launching of workflows that have been registered in the WMS.

4. The WMS of claim 2, wherein the one or more subsystems further comprise a configuration subsystem, wherein the configuration subsystem is configured to coordinate training for the one or more ML models.

5. The WMS of claim 4, wherein the optimizer subsystem, upon request from the configuration subsystem, is configured to train each ML model and enable prediction by one or more of the ML models.

6. The WMS of claim 2, wherein the configuration subsystem is configured to utilize the predictions along with other data to select task execution configurations in order to optimize a set of metrics.

7. The WMS of claim 6, wherein the set of metrics are defined by a user or the WMS.

8. The WMS of claim 2, further comprising:
one or more data access objects ("DAOs") for each ML model, the one or more DAOs comprising a train DAO, a validation DAO, and a test DAO stored in an application database on an external distributed storage and made available by a CSP interface subsystem to a training component of the optimizer subsystem for performing training and evaluation of each of the ML models of the optimizer subsystem.

9. The WMS of claim 8, wherein the training component of the optimizer subsystem achieves improvements of the ML models with respect to a cost function defined for each ML model by executing an optimization algorithm on one or more internal weights or parameters of the ML model using data from the train DAO, and using data from the validation DAO to gain performance metrics to be used in making decisions regarding hyperparameter tuning of the ML model, and using data from the test DAO to maintain a set of performance metrics for each ML model that describe the performance of a current version of the ML model.

10. The WMS of claim 3, wherein the configuration subsystem upon request by the launch engine uses pre-defined customer preferences, a location of customer data, time available, time used, dollar amount allocated, or dollar amount used to recommend the task execution configuration including the CSP to execute on, the timing of the execution of the task and the amount of memory or processing resources to allocate for the execution of the task.

11. The WMS of claim 2, wherein the configuration subsystem is configured to simulate runs of existing workflows by means of data collected from previous runs, user-provided estimates of constraints placed upon task execution time or resource usage, or estimates obtained by means of heuristic algorithms in order to inform a determination of optimal task execution configurations for the workflow in question, and wherein the configuration subsystem further launches redundant tasks and workflows with different execution configurations in order to obtain more data for training and validation of models to improve prediction performance of the ML models of the optimization subsystem.

12. The WMS of claim 2, wherein:
the optimizer subsystem upon instruction by the configuration subsystem is triggered to initiate a training pass of one or more of the ML models it contains at intervals that are regular and predefined or governed by addition of new information to an application database,
the optimizer subsystem is configured to execute a validation pass after a pre-defined number of training passes and use validation performance metrics to evaluate a pre-defined condition for termination of a training process, and
the optimizer subsystem is further configured to execute a testing pass upon termination of the training process and store test performance metrics along with train and validation performance metrics in the application database.

13. The WMS of claim 2, wherein the WMS adapts over time by making inter-task level tuning to an execution of an individual workflow embodiment.

14. The WMS of claim 2, wherein the WMS accounts for changing charged costs by CSPs for execution of tasks.

15. The WMS of claim 2, wherein tasks are executed with execution configuration recommended by the optimizer subsystem.

16. The WMS of claim 2, further comprising:
a graphing subsystem configured to display a dynamic graph for a workflow currently executing or previously having been executed on the WMS.

17. The WMS of claim 3, further comprising:
a monitor component of the launch engine subsystem that monitors changes in a state of a workflow in process of launching and collects additional metrics and statistics to store in the application database.

18. The WMS of claim 3, further comprising:
a logging subsystem configured to persist a state of a workflow launch process along with any additional metrics generated by a monitor component of the launch engine subsystem as well as the information regarding the task execution configurations selected and store the information in the application database in a means that makes it accessible to be used as labeled training and validation data to be used by the training component of the optimizer subsystem.

19. The WMS of claim 2, further comprising:
a registry subsystem configured to store task and workflow definitions to the WMS, including a parser of user-defined tasks and workflows defined by means of a data serialization language according to a predefined formalism, whereby valid tasks and workflow definitions are registered to an application database.

20. A computing system, comprising:
one or more processors; and
one or more non-transitory computer-readable media that collectively store instructions that, when executed by the one or more processors, cause the computing system to perform operations, the operations comprising:
obtaining, by the computing system, a workflow that comprises a plurality of tasks; and
for at least one of the plurality of tasks:
inputting, by the computing system, data descriptive of the task into a machine-learned model configured to receive and process the data descriptive of the task, wherein the machine-learned model comprises a reinforcement q-learning model;
receiving, by the computing system and as an output of the machine-learned model, a task execution configuration for the task, wherein the task execution configuration selects for execution of the task one of a number of available serverless cloud service providers; and
communicating, by the computing system, with the selected serverless cloud service provider to cause execution of the task by the selected serverless cloud service provider.

\* \* \* \* \*